(12) United States Patent
Kataoka et al.

(10) Patent No.: US 8,178,171 B2
(45) Date of Patent: May 15, 2012

(54) LIQUID CRYSTAL DISPLAY AND METHOD OF MANUFACTURING THE SAME

(75) Inventors: Shingo Kataoka, Kawasaki (JP); Hideaki Tsuda, Kawasaki (JP); Katsufumi Ohmuro, Kawasaki (JP); Jin Hirosawa, Kawasaki (JP); Seiji Tanuma, Kawasaki (JP); Yoshio Koike, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/779,561

(22) Filed: May 13, 2010

(65) Prior Publication Data

US 2010/0221456 A1 Sep. 2, 2010

Related U.S. Application Data

(62) Division of application No. 10/809,126, filed on Mar. 25, 2004, now Pat. No. 7,749,575.

(30) Foreign Application Priority Data

Mar. 31, 2003 (JP) ................................. 2003-094169

(51) Int. Cl.
*C09K 19/00* (2006.01)
*C09K 19/06* (2006.01)
*C09K 19/32* (2006.01)
*C09K 19/52* (2006.01)

(52) U.S. Cl. ............. 428/1.1; 428/1.2; 428/1.3; 430/20; 349/187; 252/299.01; 252/299.6

(58) Field of Classification Search ............ 428/1.1–1.3; 252/299.01, 299.6; 430/20; 349/187
See application file for complete search history.

(56) References Cited

U.S. PATENT DOCUMENTS

| 5,730,898 | A | 3/1998 | Jin et al. |
| 6,151,003 | A | 11/2000 | Tsuda et al. |
| 6,583,835 | B1 | 6/2003 | Yoshida et al. |
| 7,749,575 | B2 * | 7/2010 | Kataoka et al. ................ 428/1.1 |
| 2004/0105066 | A1 | 6/2004 | Tsuda |
| 2004/0191428 | A1 | 9/2004 | Tsuda et al. |

FOREIGN PATENT DOCUMENTS

| JP | 05-232465 | 9/1993 |
| JP | 06-118399 | 4/1994 |
| JP | A 6-110045 | 4/1994 |
| JP | 08-036186 | 2/1996 |
| JP | 08-245724 | 9/1996 |
| JP | 08-338993 | 12/1996 |
| JP | 09-179101 | 7/1997 |
| JP | 11-095221 | 4/1999 |
| JP | 2000-273098 | 10/2000 |
| JP | 2001-100212 | 4/2001 |
| JP | 2002-098828 | 4/2002 |
| JP | 2004-184522 | 7/2004 |
| KR | 2001-0015316 | 2/2001 |
| WO | WO 02/053609 | 7/2002 |

* cited by examiner

*Primary Examiner* — Geraldina Visconti
(74) *Attorney, Agent, or Firm* — Greer, Burns & Crain, Ltd

(57) ABSTRACT

The invention relates to a liquid crystal display utilizing a vertically aligned state of liquid crystal molecules when no voltage is applied and to a method of manufacturing the same. The invention is aimed at providing a liquid crystal display and a method of manufacturing the same in which the existing step for forming vertical alignment films can be omitted to achieve a cost reduction. The liquid crystal display includes a monofunctional monomer having a structure expressed by X—R (where X represents an acrylate group or a methacrylate group, and R represents an organic group having a steroid skeleton). A liquid crystal material is sandwiched between substrates which is then irradiated with ultraviolet rays to cure the monofunctional monomer, thereby forming a polymer film at an interface of a substrate. The monofunctional monomer has a hydrophobic skeleton such as an alkyl chain and a photoreactive group on one side of the skeleton.

8 Claims, 34 Drawing Sheets

FIG.2
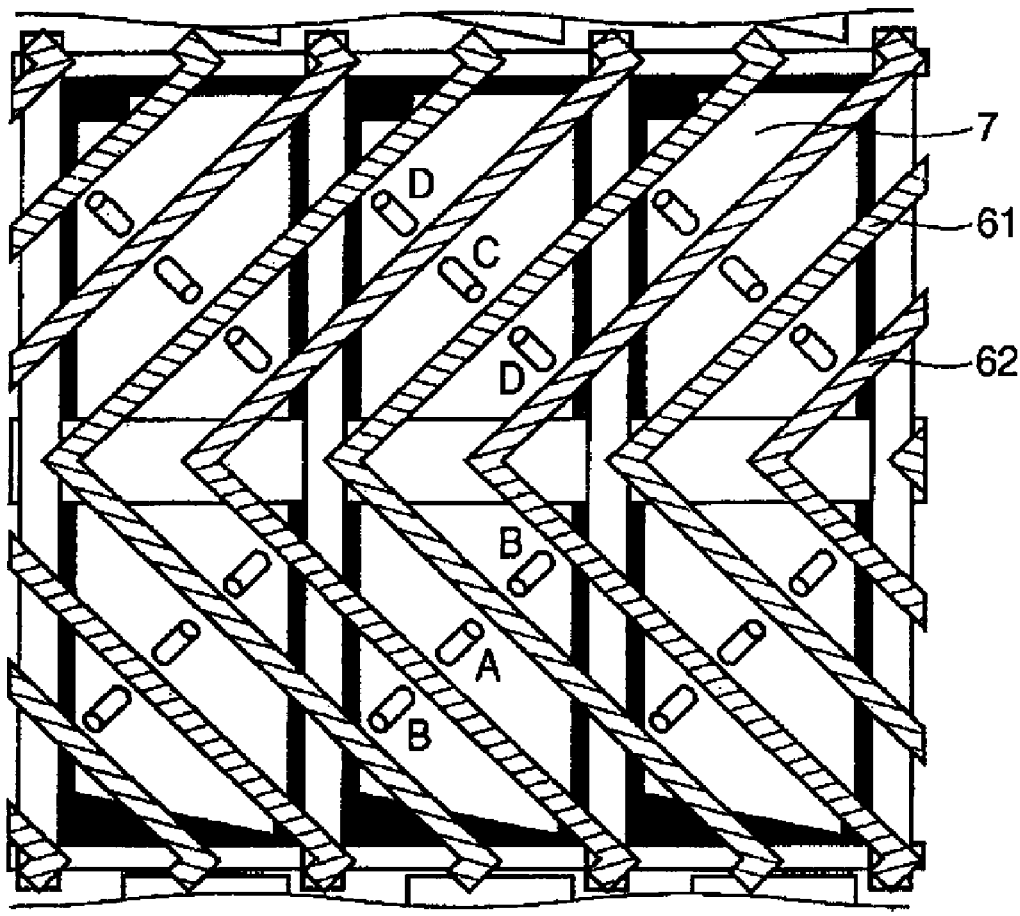
 DOMAIN DIRECTION

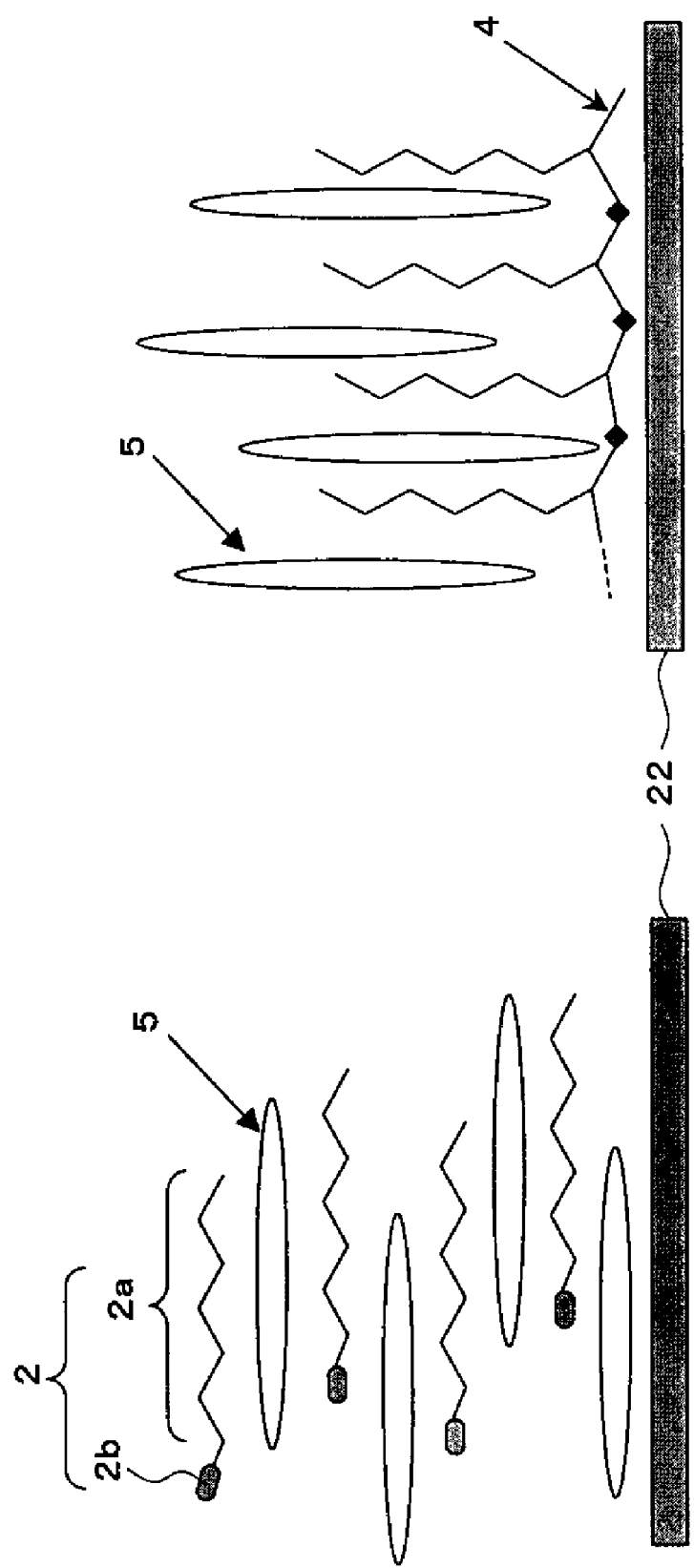

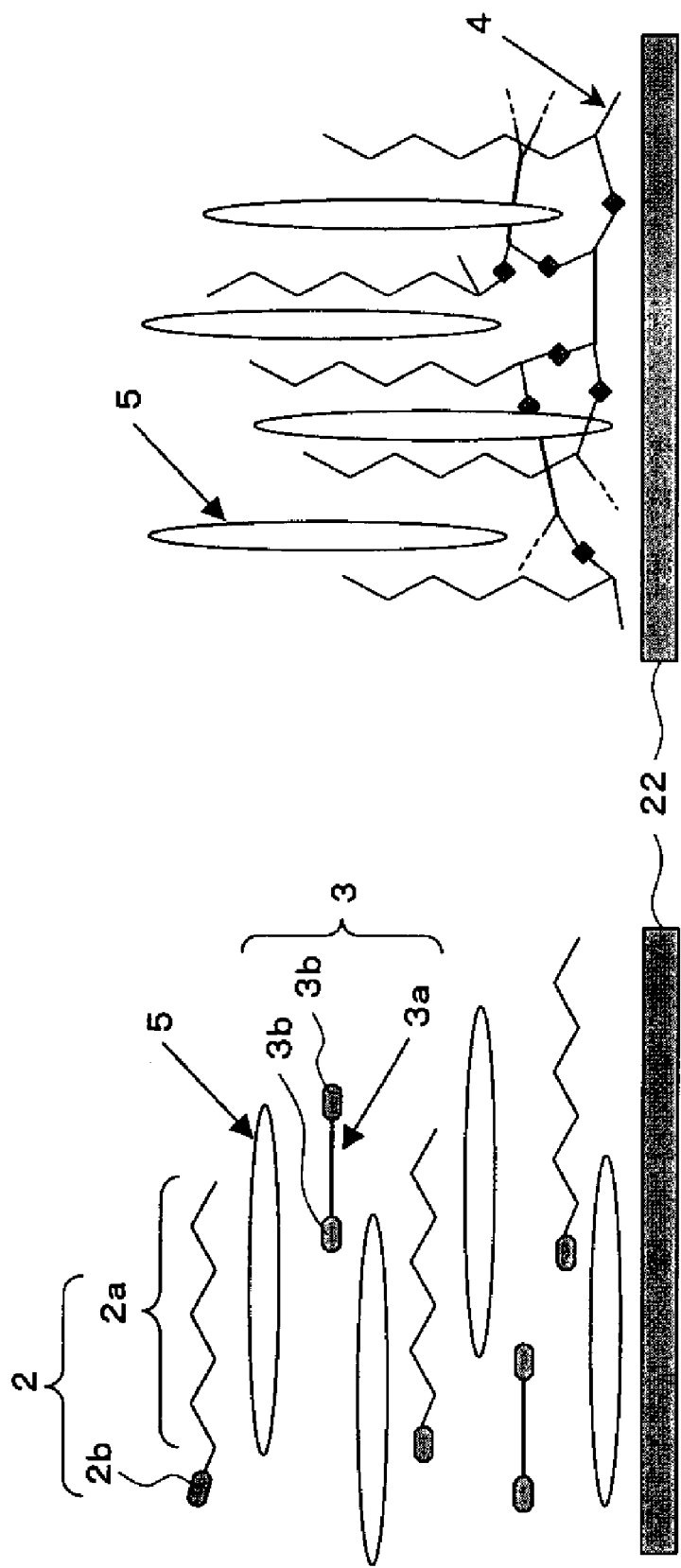

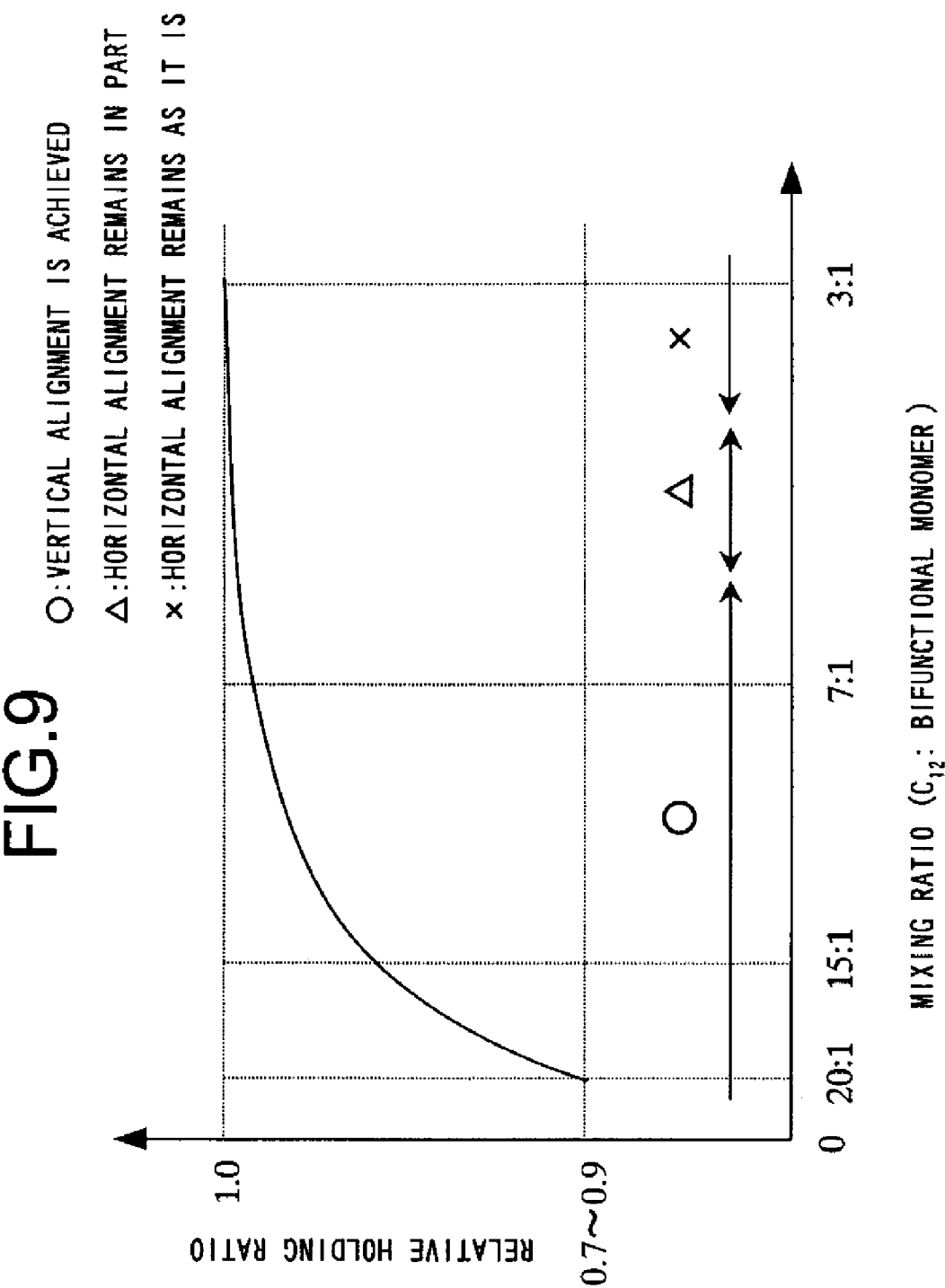

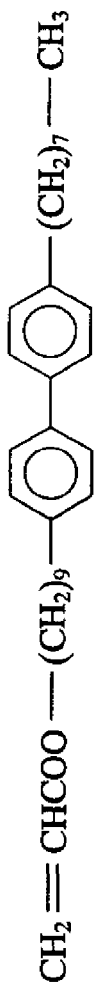
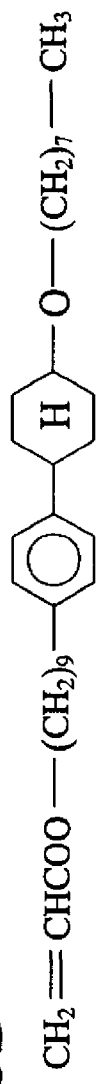
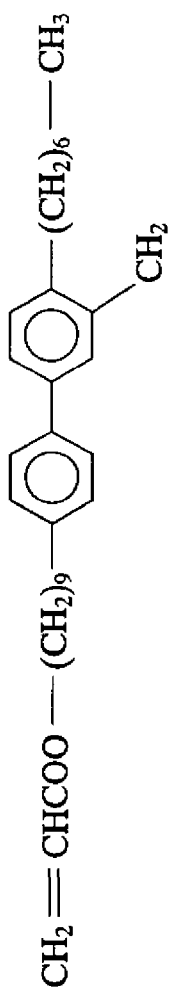
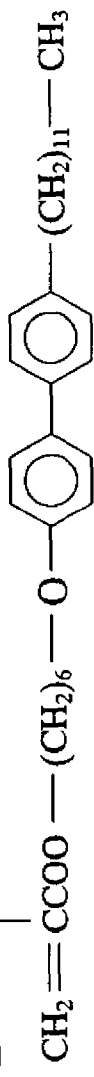
FIG.10A
FIG.10B
FIG.10C
FIG.10D

ABOUT 0.1mm

ART FIRST MODE OF INVENTION

ABOUT 0.1mm

EXAMPLE OF RELATED ART

FIG.13A  $CH_2=CHCOO-(CH_2)_9-\phi-\phi-(CH_2)_{15}-CH_3$

FIG.13B  $CH_2=CHCOO-(CH_2)_9-\phi-\phi-(CH_2)_7-CH_3$

FIG.13C  $CH_2=CHCOO-(CH_2)_2-\phi-\phi-CH_2-CH_3$

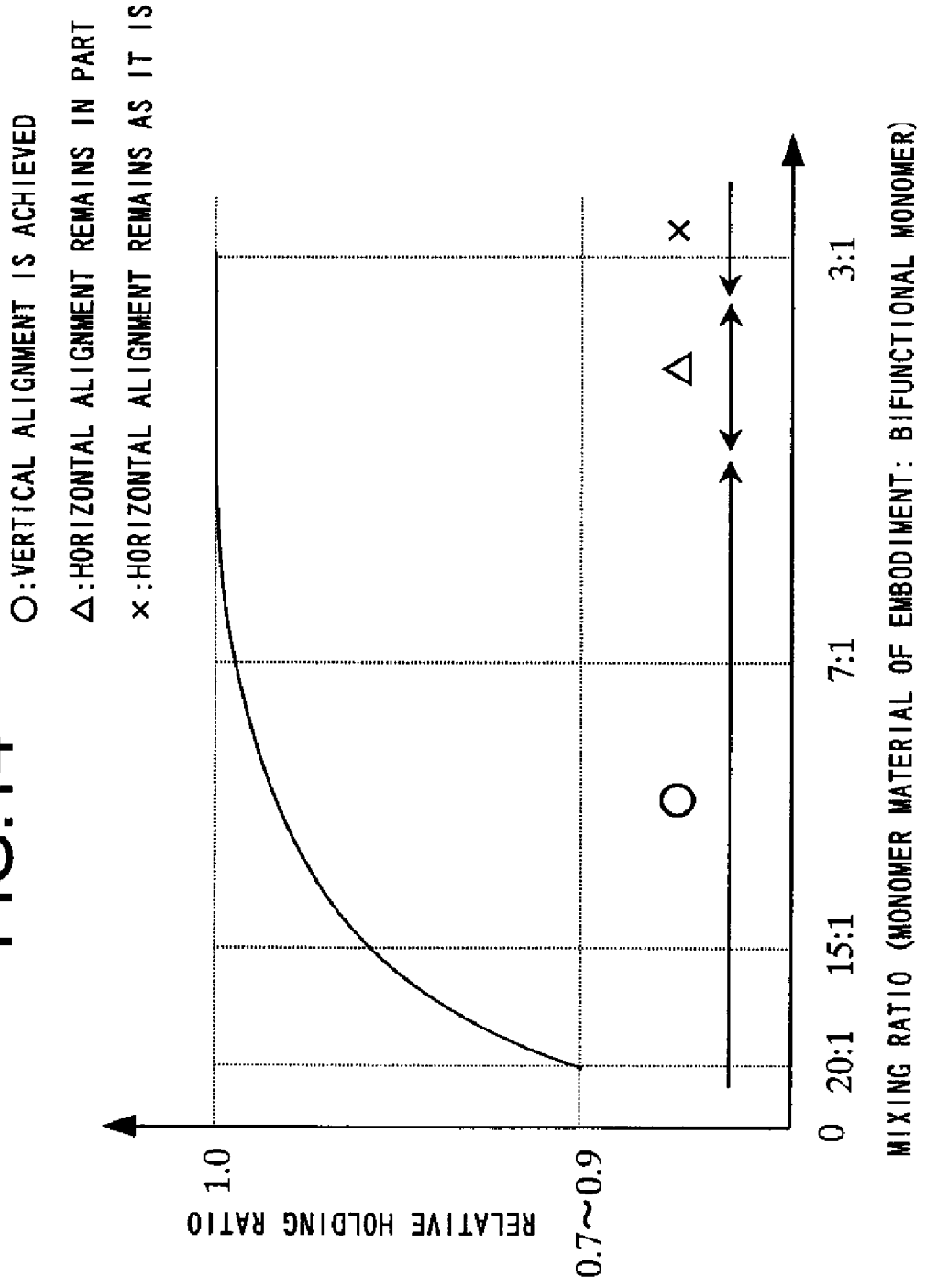

100 μm

IRRADIATION WITH DIFFUSE LIGHT

100 μm

IRRADIATION WITH PARALLEL LIGHT

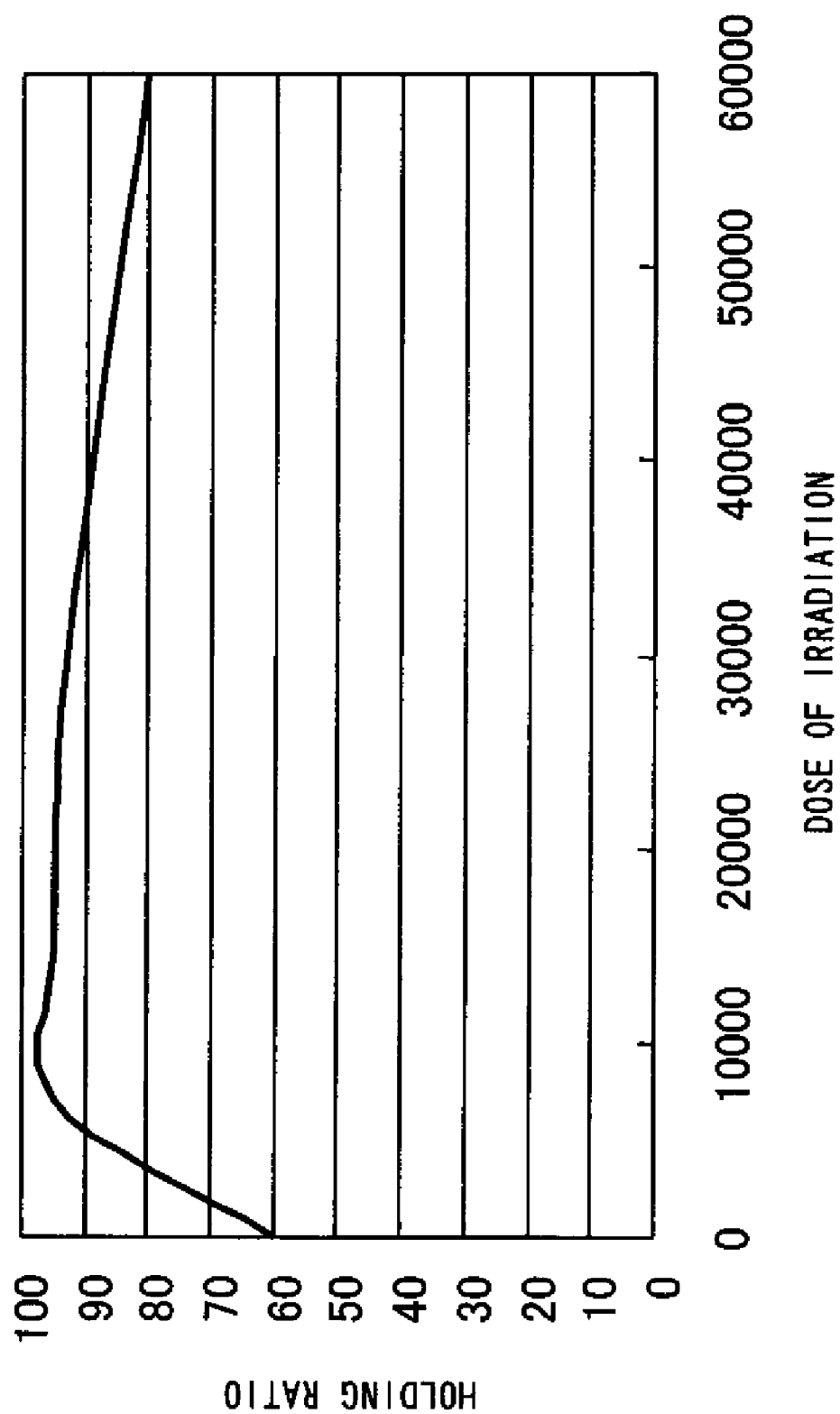

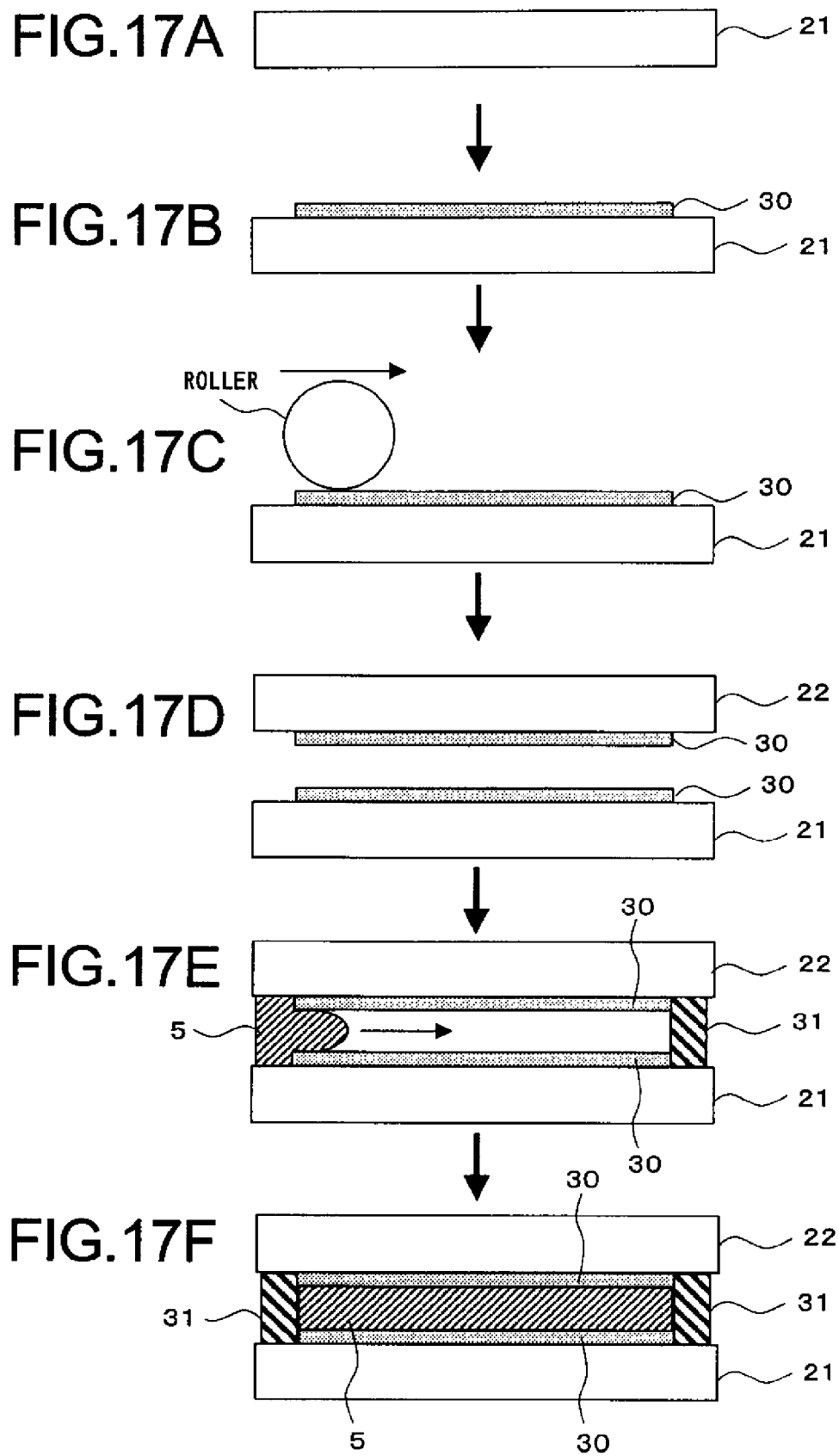

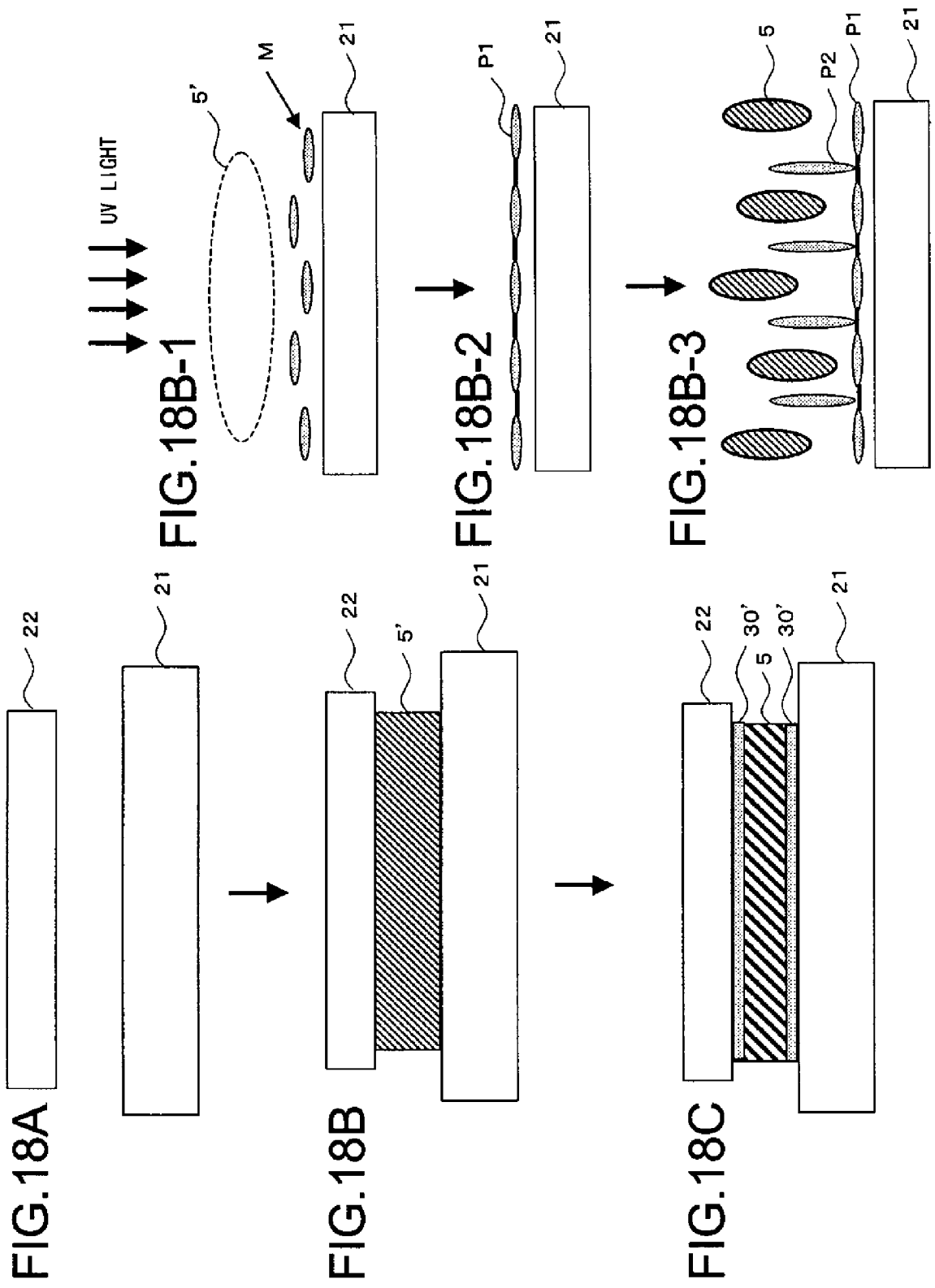

LIQUID CRYSTAL DISPLAY AND METHOD OF MANUFACTURING THE SAME

This is a divisional of application Ser. No. 10/809,126 filed Mar. 25, 2004.

BACKGROUND OF THE INVENTION

1. Field of the Invention

The present invention relates to a liquid crystal display and a method of manufacturing the same and, more particularly, to a liquid crystal display utilizing a condition in which liquid crystal molecules are vertically aligned when no voltage is applied and a method of manufacturing the same.

2. Description of the Related Art

Active matrix type liquid crystal displays (LCDs) that have been widely used include TN mode liquid crystal displays in which a liquid crystal material having positive dielectric constant anisotropy is aligned such that it is in parallel with surfaces of substrates and such that it is twisted at 90 deg. between the substrates which are opposed to each other. However, the TN mode has a problem in that it provides low viewing angle characteristics, and various studies are in progress in order to improve viewing angle characteristics.

As an alternative to this method, MVA (Multi-domain Vertical Alignment) method has been developed in which a liquid crystal material having negative dielectric constant anisotropy is vertically aligned and in which tilting directions of liquid crystal molecules are regulated by protrusions and slits provided on surfaces of substrates when a voltage is applied, and the method has successfully improved viewing angle characteristics.

An MVA type liquid crystal display will be described with reference to FIGS. 1A, 1B and 2. FIGS. 1A and 1B are perspective views showing the concept of the MVA type liquid crystal display. FIG. 2 is a conceptual diagram showing aligning directions of liquid crystal molecules on a pixel 7 of the MVA type liquid crystal display as viewed in a direction normal to a surface of a substrate thereof.

In the MVA type liquid crystal display, as shown in FIGS. 1A and 1B, a liquid crystal material (liquid crystal molecules) 5 having negative dielectric constant anisotropy is vertically aligned between two glass substrates 21 and 22. A pixel electrode connected to a ITT which is not shown is formed on the glass substrate 21, and an opposite electrode is formed on the other glass substrate 22. Protrusions 61 and 62 are alternately formed on the pixel electrode and the opposite electrode, respectively. Vertical alignment films which are not shown are formed on the pixel electrode and the opposite electrode which are not shown and on the protrusions 61 and 62.

When no voltage is applied to the liquid crystal molecules 5 with the TFT in an off-state, as shown in FIG. 1A, the liquid crystal molecules 5 are aligned in a direction perpendicular to substrate interfaces. When the TFT is turned on, an electric field acts on the liquid crystal molecules 5, and tilting directions of the liquid crystal molecules 5 are regulated by the structure in which the protrusions 61 and 62 are formed. As a result, the liquid crystal molecules 5 are aligned in a plurality of directions in one pixel as shown in FIG. 1B. For example, when the protrusions 61 and 62 are formed as shown in FIG. 2, the liquid crystal molecules 5 are aligned in each of directions A, B, C and D. Since the liquid crystal molecules 5 are aligned in a plurality of directions when the TFTs are turned on in the MVA type liquid crystal display, preferable viewing angle characteristics can be achieved.

In the above-described MVA method, vertical alignment films do not regulate the tilting directions of the liquid crystal molecules 5. Therefore, there is no need for an alignment processing step such as rubbing that is essential for horizontal aligning methods represented by the TN method. This is advantageous from the viewpoint of processing in that the problem of static electricity and waste which occurs during a rubbing process is eliminated and in that no washing process is required after an aligning process. Further, since problems such as display irregularities attributable to variation of a pre-tilt will not occur, there is another advantage in that a cost reduction can be achieved through simplification of processes and improvement of yield.

Patent Document 1: JP-A-11-95221
Patent Document 2: JP-A-5-232465
Patent Document 3: JP-A-8-338993
Patent Document 4: JP-A-8-036186

Although the MVA method has various advantages as thus described, the simplification of processes, the improvement of yield and the cost reduction can be further encouraged if the existing step for forming vertical alignment films can be omitted. Further, although there is a need for forming vertical alignment films on mother glasses which are increasing in size as a result of the recent trend toward greater LCDs, a problem has arisen in that the existing alignment film printing apparatus may become unable to satisfy such a need.

In the existing methods for forming vertical alignment films, there is a phenomenon in which horizontally aligned domains called white lines can remain in a vertically aligned region. There is a need for reducing or eliminating such white lines to suppress reduction in contrast.

SUMMARY OF THE INVENTION

It is an object of the invention to provide a liquid crystal display and a method of manufacturing the same in which the existing step for forming vertical alignment films can be omitted to achieve a cost reduction.

It is another object of the invention to provide a liquid crystal display and a method of manufacturing the same in which vertical alignment films can be easily formed even if the mother glasses are large-sized.

It is still another object of the invention to provide a liquid crystal display and a method of manufacturing the same in which white lines can be reduced to suppress reduction in contrast.

The above-described objects are achieved by a liquid crystal display having a liquid crystal material sandwiched between substrates, characterized in that:

the liquid crystal material includes a monomer material having a structure expressed by X—R (where X represents an acrylate group or a methacrylate group and R represents an organic group having a steroid skeleton); and an ultraviolet-cured substance comprising a system including the monomer material is formed at an interface of the substrates.

BRIEF DESCRIPTION OF THE DRAWINGS

FIG. 2 is a plan view showing the schematic configuration of the MVA type liquid crystal display;

FIGS. 3A and 3B show a basic principle 1 of a liquid crystal display and a method of manufacturing the same in a first mode for carrying out the invention;

FIGS. 4A and 4B show a basic principle 2 of a liquid crystal display and a method of manufacturing the same in the first mode for carrying out the invention;

FIG. 9 shows changes in the voltage holding ratio and the state of alignment depending on the mixing ratio of a monomer material mixed in a liquid crystal material of a liquid crystal display in the first mode for carrying out the invention;

FIGS. 10A to 10D show examples of monofunctional monomer materials mixed in a liquid crystal material of a liquid crystal display in a second mode for carrying out the invention;

FIGS. 13A to 13C show examples of monofunctional monomer materials mixed in a liquid crystal material of a liquid crystal display in the second mode for carrying out the invention;

FIG. 14 shows changes in the voltage holding ratio and the state of alignment depending on the mixing ratio of a monomer material mixed in a liquid crystal material of a liquid crystal display in the second mode for carrying out the invention;

FIG. 16 shows a relationship between doses of irradiation and voltage holding ratio in the method of manufacturing a liquid crystal display in the third mode for carrying out the invention;

FIGS. 17A to 17F briefly show LCD manufacturing processes according to the related art;

FIGS. 18A to 18C, 18B-1, 18B-2, and 18B-3 schematically show a method of forming an alignment control layer after injecting a liquid crystal;

FIG. 19 shows display irregularities which are observed when a liquid crystal display panel of a 15-inch type active matrix LCD is turned on;

DETAILED DESCRIPTION OF THE PREFERRED EMBODIMENTS

Figure 1A:
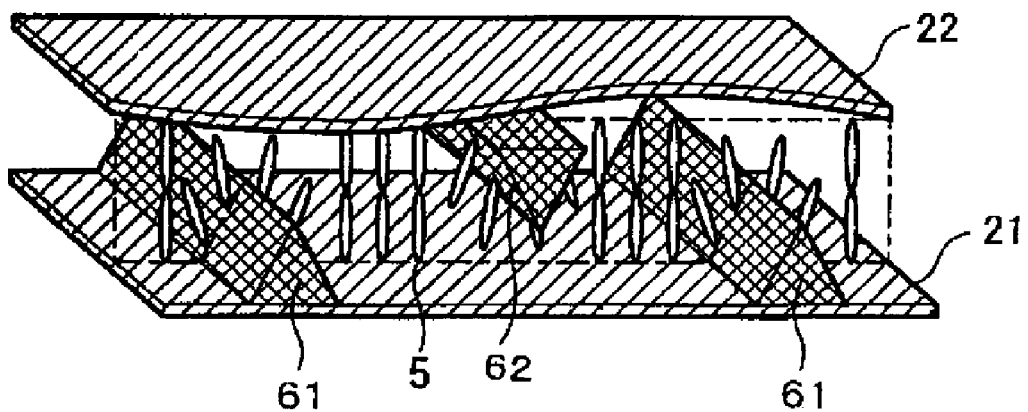
FIGS. 1A and 1B are perspective views showing a schematic configuration of an MVA type liquid crystal display.

First Mode for Carrying Out the Invention

A liquid crystal display and a method of manufacturing the same in a first mode for carrying out the invention will now be described with reference to FIGS. 3A to 9. In the present mode for carrying out the invention, two substrates having no vertical alignment film formed thereon are provided opposite to each other to sandwich a liquid crystal material between them. The liquid crystal material includes a monomer material having a molecular structure in which director directions of liquid crystal molecules can be regulated and having a photoreactive group on one side of its skeleton. After the liquid crystal material is sandwiched between the substrates, an ultraviolet-cured substance (polymer) obtained by curing the monomer material through irradiation with ultraviolet rays is formed on interfaces of the substrates. A common molecular structure in which director directions of liquid crystal molecules can be regulated is an alkyl chain. A photoreactive group is a skeleton which has an unsaturated double bond such as an acrylate group, a methacrylate group, a vinyl group or an allyl group and which can be polymerized with another molecule when irradiated with ultraviolet rays.

FIGS. 3A and 3B show a basic principle 1 of the present mode for carrying out the invention. Immediately after the liquid crystal is injected, as shown in FIG. 3A, liquid crystal molecules 5 which are mixed with a monofunctional monomer 2 having a hydrophobic skeleton 2a such as an alkyl chain and a photoreactive group 2b on one side of the skeleton are horizontally aligned. Nothing is formed on the surface of a substrate 22. When irradiated with ultraviolet rays, as shown in FIG. 3B, a polymer film 4 is formed on the surface of the substrate 22 such that groups which regulate director directions of the liquid crystal molecules 5 align the liquid crystal molecules 5 perpendicularly to an interface. Unlike existing liquid crystals referred to as polymer-dispersed liquid crystals (PDLCs), alignment is controlled using a polymer (resin) film 4 in the form of a thin film which is formed on the surface of the substrate 22 like an alignment film instead of forming a polymer throughout the liquid crystal layer. When polymers are constituted by only monofunctional monomers 2, the polymers are in a structure in which they are serially arranged as shown in FIG. 3B, and the polymer film 4 becomes a resin film in which the polymers are physically deposited on and caught in each other.

FIGS. 4A and 4B show a basic principle 2 of the present mode for carrying out the invention. When bifunctional monomers 3 each having a hydrophobic skeleton 3a such as an alkyl chain and photoreactive groups 3b on both sides of the skeleton as shown in FIG. 4A or multifunctional monomers having a greater number of photoreactive groups (functional groups) are used in addition to monofunctional monomers 2, a polymer film 4 in the form of network that is chemically steric is formed, as shown in FIG. 4B. A more rigid and reliable polymer film 4 can be obtained in this case.

When monofunctional alkyl monomers in which only one photoreactive group is added to an ordinary alkyl chain $C_nH_{2n+1}$ are used to erect liquid crystal molecules vertically, the vertically aligning property is not so high, and a problem remains in that it is difficult to reduce the mixing ratio of bifunctional monomers. Substantially no difference is observed in alignment even when alkyl chains are varied from $C_{12}$ (lauryl) through $C_{18}$ (stearyl). This is considered attributable to the fact that a simple alkyl chain as described above has high flexibility and that contribution to vertically aligning property becomes smaller as the alkyl chain becomes longer.

Close studies and trials have revealed that the use of a material having a steroid skeleton as a component of the ultraviolet-cured resin to be formed makes it possible to improve vertical alignment ability. In particular, organic groups as shown in FIGS. 5A to 5D are preferable among groups having a steroid skeleton. By using such a material having a steroid skeleton, vertically aligning properties higher than that achievable with simple alkyl monomers can be achieved even when the dose of the material is substantially halved in terms of molar ratio.

In order to maintain the reliability of the liquid crystal display, it is essential to prevent the release of impurity ions into the liquid crystal. For this purpose, the ultraviolet-cured resin is formed using a system which has at least one ring structure and which is mixed with a bifunctional material having an acrylate group or a methacrylate group on one end thereof or a material having more functions. Close studies and trials have revealed that the use of such a material makes it possible to form a resin film having less monomer residues without adding a polymerization initiator. In particular, it is preferable to use materials as shown in FIGS. 6A to 6D in which no spacer intervenes between a ring structure and an acrylate group or methacrylate group. In case that a spacer(s) intervenes, it is preferable that there is only one spacer —$CH_2$—.

The ratio of unreacted residues of a multifunctional monomer having two or more functions as described above decreases as the mixing ratio of the monomer is increased, and electrical characteristics such as a voltage holding ratio are improved accordingly. However, it becomes unable to achieve vertical alignment when the ratio is increased beyond a certain level. In order to solve this problem, bifunctional monomers having a steroid skeleton as shown in FIGS. 5A to 5D are used. By substituting bifunctional monomers having a steroid skeleton as described above for all or part of the bifunctional monomers, it becomes possible to provide a resin film whose electrical characteristics and vertically aligning properties are balanced at a high level and to provide an excellent liquid crystal display.

A detailed description will follow with reference to specific embodiments and comparative examples.

Embodiment 1-1

Monomers were fabricated which had a steroid skeleton as shown in FIGS. 5A to 5D and in which an acrylate group was substituted for an OH group in the figure. The monomers in an amount of $1.3 \times 10^{-4}$ mol/g were dissolved in a negative liquid crystal A. Bifunctional monomers having a ring structure as shown in FIGS. 6A to 6D in an amount of $1.3 \times 10^{-5}$ mol/g that is one-tenth of the above amount were then dissolved in the liquid crystal material. The resultant mixed liquid crystals were injected and sealed in evaluation cells. Two glass substrates having ITO (indium tin oxide) films formed thereon as electrodes were used as an evaluation cell, and the substrates were combined with a cell thickness of 4.25 μm. The substrates used were formed with no alignment film and were irradiated with ultraviolet rays of 1500 mJ/cm$^2$ on surfaces thereof.

An observation of the state of alignment of the evaluation cells immediately after fabrication revealed that there was fluid alignment and that both of horizontal alignment and vertical alignment existed. Thereafter, the evaluation cells were annealed for 30 minutes at 90° C. and were irradiated with unpolarized ultraviolet rays of 9000 mJ/cm$^2$ after being cooled. An observation of alignment revealed that perfect vertical alignment was achieved throughout the evaluation cells.

Comparative Example 1-1

An experiment similar to Embodiment 1-1 was conducted using a monomer material having no steroid skeleton, i.e. lauryl acrylate $CH_2$=$CHCOOC_{12}H_{25}$.

As a result, substantially no change in alignment was observed between states before and after irradiation with ultraviolet rays, and preferable vertical alignment could not be achieved. When the dose of the material was gradually increased, vertical alignment was achieved at a dose of 2.4 to 2.5×10$^{-4}$ mol/g which was about twice that in the embodiment (the bifunctional monomers were dissolved in the fixed ratio of one-tenth, i.e., in an amount of 2.4×10$^{-5}$ mol/g). However, many defects in the form of white lines were observed in any parts in an initial state of vertical alignment. A similar experiment conducted using stearyl acrylate $CH_2$=$CHCOOC_{18}H_{37}$ indicated no clear difference from lauryl acrylate.

Comparative Example 1-2

An experiment similar to Comparative Example 1-1 was conducted by using a monomer HDDA having no ring structure instead of bifunctional monomers having a ring structure as shown in FIGS. 6A to 6D, dissolving it in the same amount 1.3×10$^{-5}$ mol/g in the liquid crystal material, and fabricating an evaluation cell from the resultant mixed liquid crystal.

As a result, substantially no change in alignment was observed between states before and after irradiation with ultraviolet rays similarly to the Comparative Example 1-1, and vertical alignment was not achieved when irradiation was continued with ultraviolet rays of 9000 mJ/cm$^2$ unlike Embodiment 1-1. Then, Irg651 of 0.2% by weight as a polymerization initiator was added to the liquid crystal which was then irradiated with ultraviolet rays, and the liquid crystal as a whole could be vertically aligned. However, measurement of the voltage holding ratio revealed that there was a significant reduction in the voltage holding ratio around the injection hole.

Comparative Example 1-3

An experiment similar to Comparative Example 1-1 was conducted by using bifunctional monomers having one or more ring structures as shown in FIGS. 6A to 6D and providing $CH_2$ between a ring structure and an acrylate group or a methacrylate group (the relationship of FIG. 6D to FIG. 6C), and differences in reactivity were observed. $CH_2$ was provided in different quantities, i.e., 1, 2, 4 and 6 with the mixing ratio and the quantity of the monomers added in terms of mol kept unchanged.

As a result, changes before and after irradiation with ultraviolet rays abruptly diminished when two $CH_2$ were provided substantially regardless of the number of ring structures and the structure for connecting rings, and vertical alignment was not achieved in samples having four and six $CH_2$ after irradiation with ultraviolet rays however great the dose was.

Embodiment 1-2

Lauryl acrylate of 2.4×10$^{-4}$ mol/g and bifunctional monomers having ring structures as shown in FIGS. 6A to 6D were dissolved in a negative liquid crystal A, and resultant mixed liquid crystals were injected and sealed in evaluation cells. The evaluation cells were fabricated with the molar ratio of the bifunctional monomers to lauryl acrylate varied. Other conditions for fabrication followed those for Embodiment 1-1, and two glass substrates having ITO films formed thereon as electrodes were used for an evaluation cell and were combined with a cell thickness of 4.25 μm. The substrates used had no alignment film formed thereon and were irradiated with ultraviolet rays of 1500 mJ/cm$^2$ on surfaces thereof.

Figure 7:
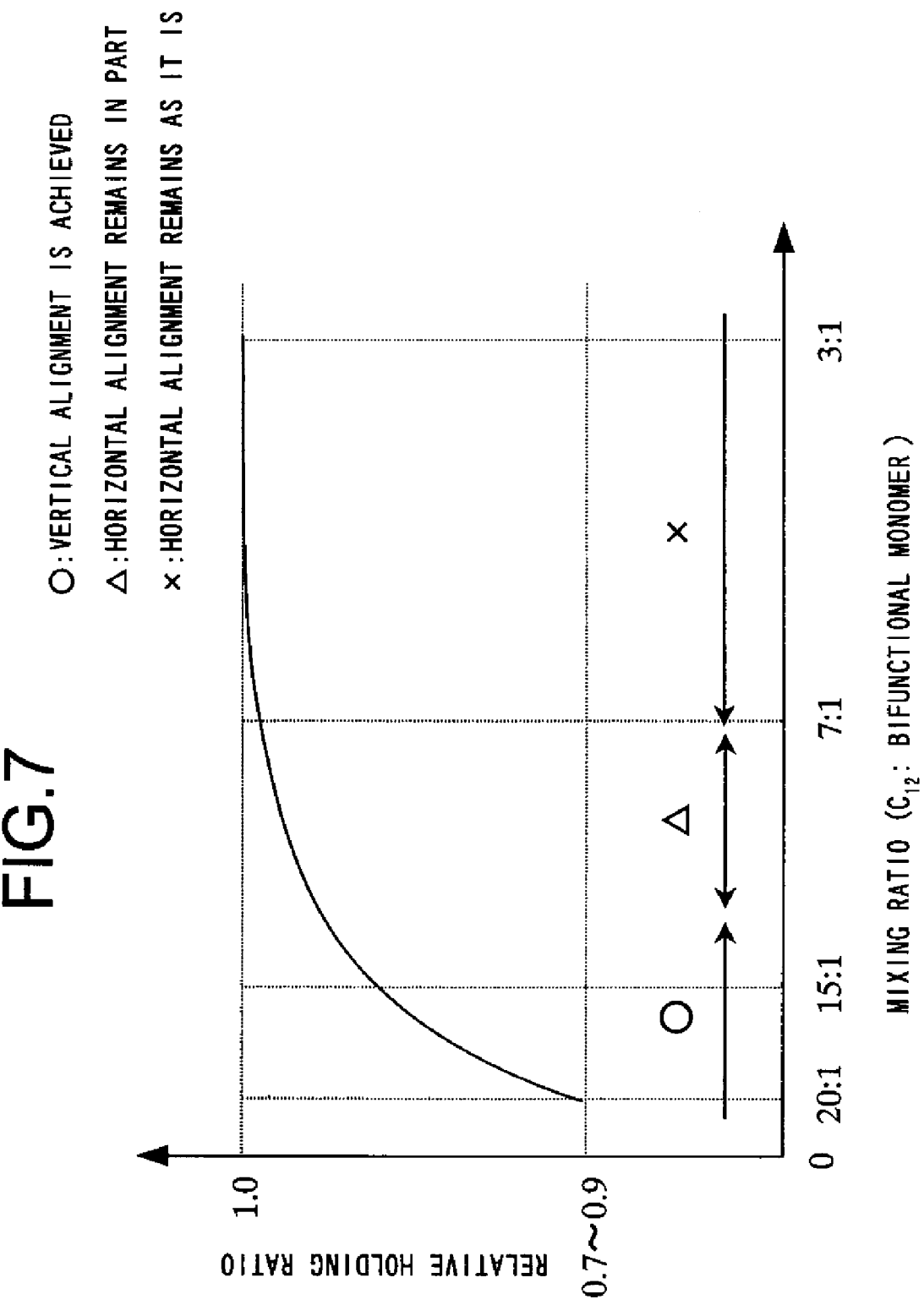
FIG. 7 shows changes in the voltage holding ratio and the state of alignment depending on the mixing ratio of a monomer material mixed in a liquid crystal material of a liquid crystal display in the first mode for carrying out the invention.
Figure 8A:
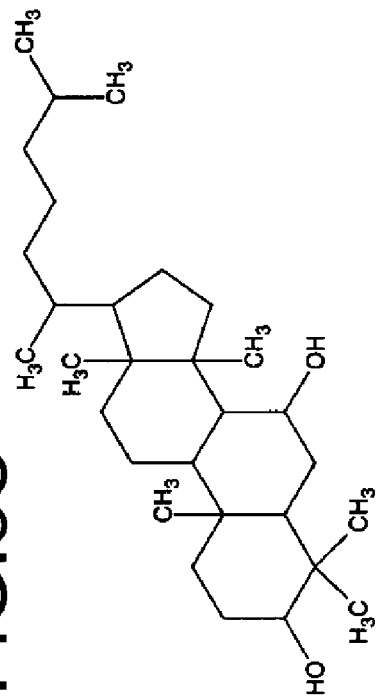
FIGS. 8A to 8D show examples of divalent organic groups having a steroid skeleton mixed in a liquid crystal material of a liquid crystal display in the first mode for carrying out the invention.
Figure 8B:
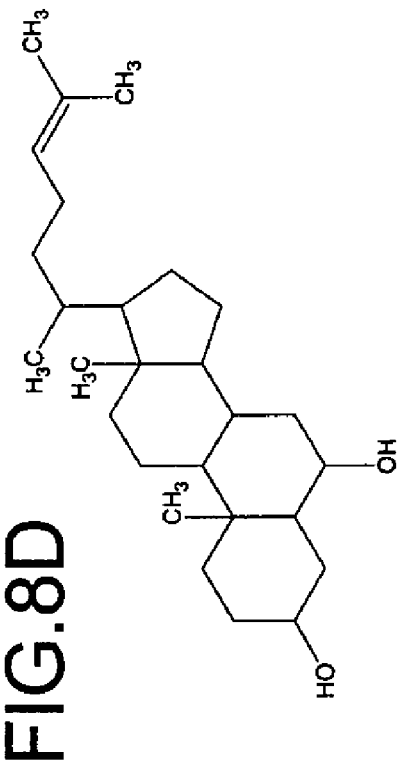
Figure 8C:
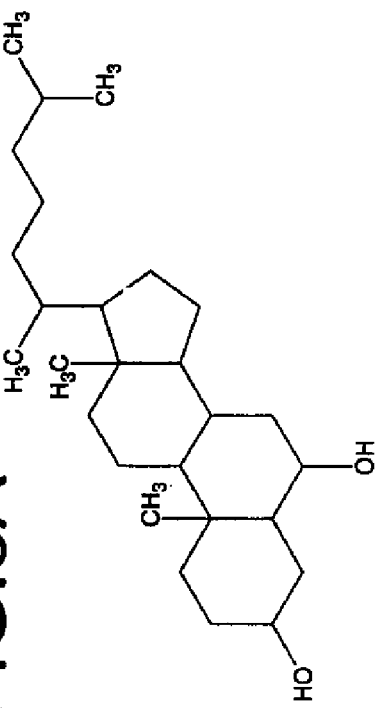
Figure 8D:
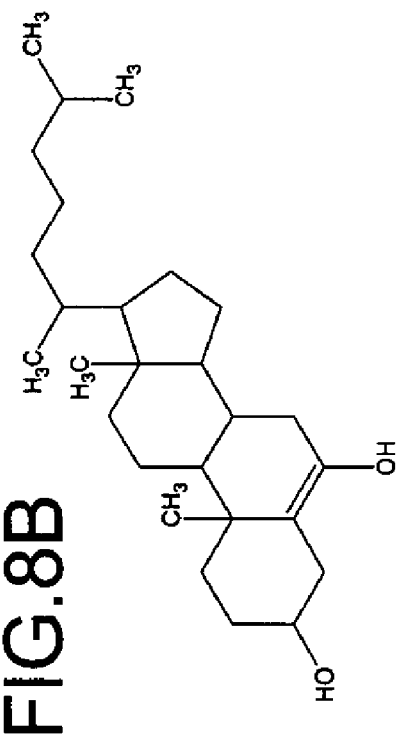
Figure 11A:
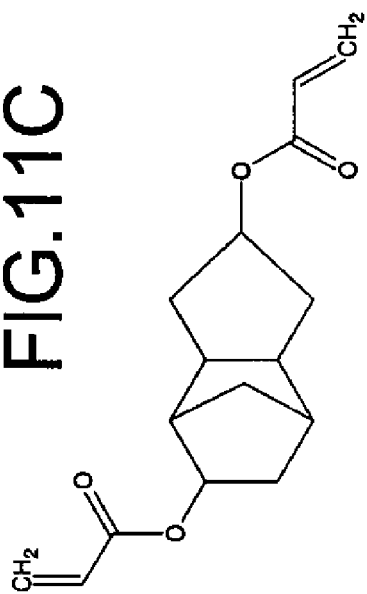
FIGS. 11A to 11D show examples of monomer materials having a ring structure mixed in a liquid crystal material of a liquid crystal display in the second mode for carrying out the invention.
Figure 11B:
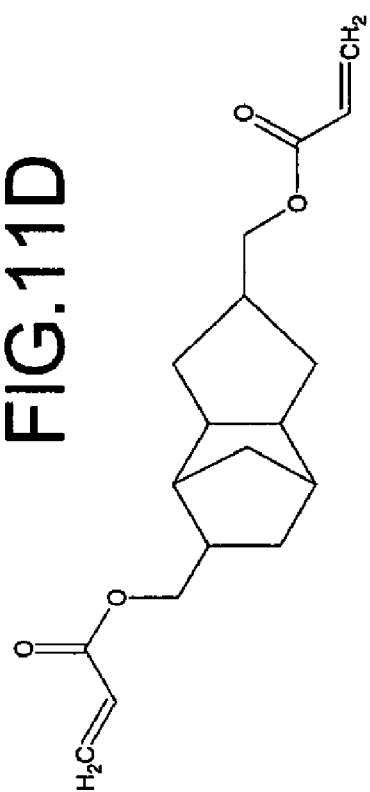
Figure 11C:
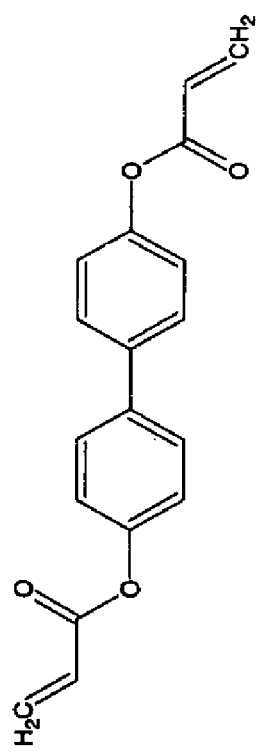
Figure 11D:
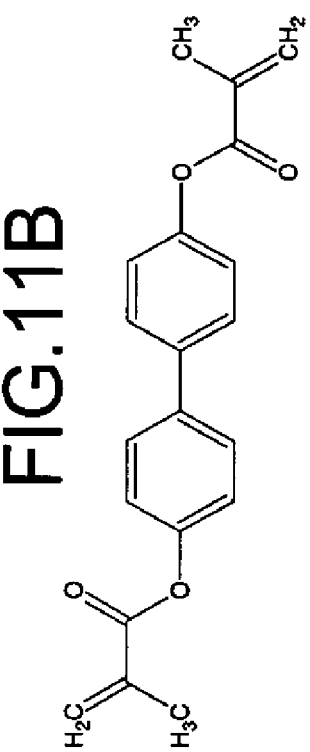

FIG. 7 shows results of evaluation of voltage holding ratio and vertically aligning properties after irradiation with ultraviolet rays of 9000 mJ/cm$^2$, the holding period being 1.67 s. The abscissa axis of FIG. 7 represents mixing ratios between lauryl acrylate and the bifunctional monomers, and the ordinate axis represents relative holding ratio. A holding ratio of 100(%) is the value of a holding ratio in a saturated state. Referring to the symbols above the horizontal arrows in the figure, the circle represents a region of mixing ratios in which vertical alignment could be achieved; the triangle represents a region of mixing ratios in which horizontal alignment partially remained; and the cross represents a region of mixing ratios in which horizontal alignment remained as it was. As shown in FIG. 7, the voltage holding ratio gradually increased with the ratio of the bifunctional monomers, and saturation was substantially reached at a ratio in the range from about 7:1 to 6:1 for any of the materials. However, vertically aligning properties gradually deteriorated on the contrary, and some regions appeared with insufficient verticalness around when the mixing ratio dropped below 10:1. The results were conflicting in that vertical alignment cannot be achieved under conditions that allow the best holding ratio to be achieved.

A similar experiment was conducted with the half of the dose of the bifunctional monomers replaced with bifunctional monomers having structures as shown in FIGS. 8A to 8D which had steroid skeletons and in which OH groups were acrylate groups. FIG. 9 shows the result. The abscissa axis of FIG. 9 represents mixing ratios between lauryl acrylate and the bifunctional monomers, and the ordinate axis represents relative holding ratio. Referring to the symbols above the horizontal arrows in the figure, the circle represents a region of mixing ratios in which vertical alignment could be achieved; the triangle represents a region of mixing ratios in which horizontal alignment partially remained; and the cross represents a region of mixing ratios in which horizontal alignment remained as it was. As shown in FIG. 9, while no significant change was observed in the process of the change in the voltage holding ratio, vertical alignment could be achieved in an increased range to allow both of the voltage holding ratio and vertical alignment to be achieved at a high level which had not been achievable so far.

As described above, since the use of the present mode for carrying out the invention eliminates the need for an alignment film forming step for liquid crystal displays, in particular, vertical alignment type displays represented by MVA types, a significant cost reduction can be achieved.

Further, a liquid crystal alignment control layer can be easily formed even on an ultra-large mother glass which cannot be sufficiently handled with alignment film printing apparatus according to existing methods without being affected by the size of the same. The invention also makes it possible to provide liquid crystal displays utilizing substrates which are difficult to print such as substrates having great irregularities and substrates having curved surfaces.

Second Mode for Carrying Out the Invention

A liquid crystal display and a method of manufacturing the same in a second mode for carrying out the invention will now be described with reference to FIGS. 10A to 14. As described above, not so high vertical alignment is achieved by monofunctional alkyl monomers in which only one photoreactive group is added to an ordinary alkyl chain $C_nH_{2n+1}$ in order to align the liquid crystal molecules vertical.

Close studies and trials revealed that vertical alignment ability could be improved by using a material system in which a ring structure is introduced between ordinary alkyl chains as a component of the ultraviolet-curved resin to be formed. More specifically, the liquid crystal material includes a monomer material having a structure expressed by:

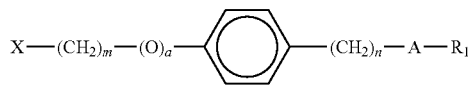

(where X represents an acrylate group or methacrylate group; A represents a benzene ring or cyclohexane ring; $R_1$ represents an alkyl group or alkoxy group having carbon atoms in a quantity in the range from 1 to 20; a represents 0 or 1; m represents an integral number in the range from 0 to 10; and n represents an integral number in the range from 0 to 2) or a monomer material having a structure expressed by:

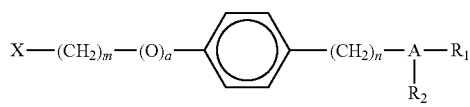

(where X represents an acrylate group or methacrylate group; A represents a benzene ring or cyclohexane ring; $R_1$ represents an alkyl group or alkoxy group having carbon atoms in a quantity the range from 1 to 20; $R_2$ represents $CH_3$ or a fluorine atom; a represents 0 or 1; m represents an integral number in the range from 0 to 10; and n represents an integral number in the range from 0 to 2), and the liquid crystal material is sandwiched between substrates and is then irradiated with ultraviolet rays to cure the monomer material, thereby forming an ultraviolet-cured substance on an interface of a substrate.

At this time, the value n is preferably 0 from the viewpoint of vertical aligning power, and a preferable result will then be obtained with regard to vertical aligning power relative to the dose in terms of molar ratio. However, solubility is slightly reduced. Further, the value a is preferably 0 to reduce the molecular weight, and the value m is set at 0 in this case to make it possible to provide a structure in which a reacting group is directly coupled with a benzene ring. Such values may be appropriately set with respect to the liquid crystal to be mixed to achieve higher effects.

The most significant problem in utilizing the above-described monomer is solubility. A material is useless if it cannot be dissolved in a liquid crystal that is the base material to be used with the same in an amount required to achieve vertical alignment however high vertical aligning power it may have Close studies and trials revealed that a resin film capable of achieving preferable vertical alignment cannot be formed unless the sum of the number of carbon atoms of the group represented by $R_1$ and the integral number n is 20 or less. It was also reveled that the advantage of the monomer over alkyl monomers in the related art is reduced when the sum of the number of carbon atoms of the group represented by $R_1$ and the integral number n is less than 5. Thus, the sum of the number of carbon atoms of the group represented by $R_1$ and the integral number n must be in the range from 5 to 20 as a requirement for forming the monomer material. Especially, the group $R_1$ is desirably an alkyl group having about 6 to 12 carbons or an alkoxyl group that is similar to the same in length.

$CH_3$ or a fluorine atom may be introduced as $R_2$ in the formula to improve the vertical aligning power and solubility. FIGS. 10A to 10D show examples of monofunctional monomer materials in the present mode for carrying out the invention. The use of such a material makes it possible to achieve vertically aligning properties higher than those achievable with a simple alkyl monomer even when the dose of the former is about one-half the dose of the latter in terms of molar ratio.

In order to maintain the reliability of a liquid crystal display, it is essential to prevent the release of impurity ions into the liquid crystal. For this purpose, an ultraviolet-cured resin is formed using a system which has at least one ring structure and which is mixed with a bifunctional material having an acrylate group or a methacrylate group on one end thereof or a material having more functions. Close studies and trials have revealed that the use of such a material makes it possible to form a resin film having less monomer residues without adding a polymerization initiator. In particular, it is preferable to use materials as shown in FIGS. 11A to 11D in which no spacer intervenes between a ring structure and an acrylate group or methacrylate group. In case that a spacer (s) intervenes, it is preferable that there is only one spacer —$CH_2$—.

The ratio of unreacted residues of monomers having two or more functions as described above decreases as the mixing ratio of the monomers is increased, and electrical characteristics such as a voltage holding ratio are improved accordingly. However, it becomes unable to achieve vertical alignment with an alkyl monomer according to the related art when the ratio is increased beyond a certain level. However, the use of a monofunctional monomer as shown in the present mode for carrying out the invention solves the problem and makes it possible to provide a resin film whose electrical characteristics and vertically aligning properties are balanced at a high level and to provide an excellent liquid crystal display.

A detailed description will follow with reference to specific embodiments and comparative examples.

Embodiment 2-1

Monomers were fabricated which had structures including a ring structure between alkyl chains as shown in FIGS. 10A to 10D. The monomers in an amount of $1.3 \times 10^{-4}$ mol/g were dissolved in a negative liquid crystal A. Bifunctional monomers having a ring structure as shown in FIGS. 11A to 11D in an amount of $1.3 \times 10^{-5}$ mol/g that is one-tenth of the above amount were then dissolved in the liquid crystal A. The resultant mixed liquid crystals were injected and sealed in evaluation cells. Two glass substrates having ITO films formed thereon as electrodes were used as an evaluation cell, and the substrates were combined with a cell thickness of 4.25 μm. The substrates used were formed with no alignment film and were irradiated with ultraviolet rays of 1500 mJ/cm² on surfaces thereof.

Figure 12B:
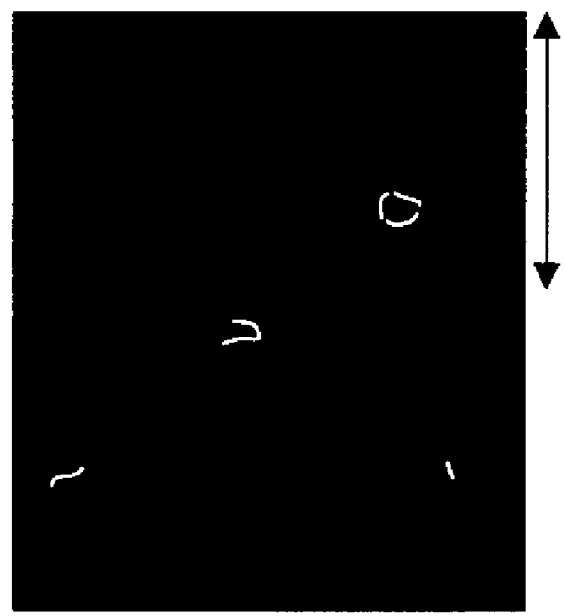
FIGS. 12A and 12B show a phenomenon in which horizontally aligned domains appearing as white lines are generated in a vertically aligned region.
Figure 12A:
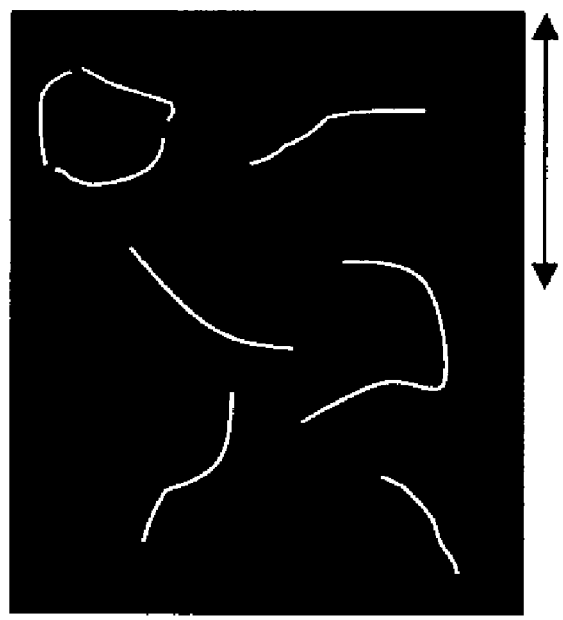

An observation of the state of alignment of the evaluation cells immediately after fabrication revealed that there was fluid alignment and that both of horizontal alignment and vertical alignment existed. Thereafter, the evaluation cells were annealed for 30 minutes at 90° C. and were irradiated with unpolarized ultraviolet rays of 9000 mJ/cm² after being cooled. An observation of alignment revealed that perfect vertical alignment was achieved throughout the evaluation cells. FIGS. 12A and 12B show a phenomenon in which horizontally aligned domains appearing as white lines are formed in a vertically aligned region. Although defects in the form of white lines were observed in some parts in an initial state of vertical alignment as shown in FIG. 12B, they completely disappeared when a pressure was applied to those locations and did not appear again thereafter.

Comparative Example 2-1

An experiment similar to Embodiment 2-1 was conducted using an ordinary alkyl monomer material having no ring structure between alkyl chains, i.e. lauryl acrylate $CH_2=CHCOOC_{12}H_{25}$.

As a result, substantially no change in alignment was observed between states before and after irradiation with ultraviolet rays, and preferable vertical alignment could not be achieved. When the dose of the material was gradually increased, a vertically aligned state was achieved at a dose of 2.4 to $2.5\times10^{-4}$ mol/g which was about twice that in the embodiment (the bifunctional monomers were dissolved at the fixed ratio of one-tenth, i.e., in an amount of $2.4\times10^{-5}$ mol/g). However, many defects in the form of white lines were observed in the vertically aligned state as shown in FIG. 12A. Thus, contrast was low, and roughness was noticeable in display of black and was not so much reduced even when a pressure was applied to locations with roughness. A similar experiment conducted using stearyl acrylate $CH_2=CHCOOC_{18}H_{37}$ indicated no clear difference from lauryl acrylate.

Comparative Example 2-2

An experiment similar to Comparative Example 2-1 was conducted by using a monomer HDDA having no ring structure instead of bifunctional monomers having a ring structure as shown in FIGS. 11A to 11D, dissolving it in the same amount $1.3\times10^{-5}$ mol/g in the liquid crystal material, and fabricating an evaluation cell from the resultant mixed liquid crystal.

As a result, no significant change in alignment was observed between states before and after irradiation with ultraviolet rays just as in Comparative Example 2-1, and perfect vertical alignment was not achieved when irradiation was continued with ultraviolet rays of 9000 mJ/cm² unlike Embodiment 2-1. Then, Irg651 of 0.2% by weight as a polymerization initiator was added to the liquid crystal which was then irradiated with ultraviolet rays, and the liquid crystal as a whole could be vertically aligned. However, measurement of the voltage holding ratio revealed that there was a significant reduction in the voltage holding ratio around the injection hole.

Embodiment 2-2

Solubility and vertically aligning properties were evaluated using materials having alkyl skeleton portions with different lengths. FIGS. 13A to 13C show examples of the materials used. First, when the material shown in FIG. 13A was used, the material dissolved in the liquid crystal in an amount of 1.5% by weight but deposited during a process of vacuum injection when the amount was 1.8% by weight. A cell was fabricated under the condition of 1.5% by weight at which the material was soluble, and the state of alignment was observed after irradiating the same with ultraviolet rays, which revealed no significant change from the state before the irradiation. At this time, the sum of the number of carbon atoms of the group represented by $R_1$ and the integral number m in the above formula was 25.

Solubility was then observed with the length of the alkyl skeleton portion gradually reduced. As a result, the material became soluble in an amount of 2.5% or more by weight when the sum of the number of carbon atoms of the group $R_1$ and the integral number m became about 20. Since this means a reduction of about 20% in terms of molecular weight, the soluble amount in terms of molar weight was increased by a factor of two or more.

The material was dissolved in an amount of $1.3\times10^{-4}$ mol/g in a negative liquid crystal A. just as in Embodiment 2-1, and bifunctional monomers having ring structures as shown in FIGS. 11A to 11D were then dissolved in an amount of $1.3\times10^{-5}$ mol/g that is one-tenth of the above amount. Cells were fabricated using resultant mixed liquid crystals. An observation of alignment after irradiation with ultraviolet rays revealed that perfect vertical alignment was achieved throughout the evaluation cells.

When the lengths of the alkyl skeleton portions of the monomers were reduced as shown in FIGS. 13B and 13C, vertical alignment was achieved but a phenomenon was observed, in which many white lines shown in FIG. 12A became visible to reduce the advantage of the materials over ordinary alkyl monomers. At that time, the sum of the number of carbon atoms of the group $R_1$ and the integral number m was about 3 or 4. When the lengths were further reduced, it became impossible to achieve perfect vertical alignment without relying upon other skeleton portions.

Embodiment 2-3

Lauryl acrylate of $2.4\times10^{-4}$ mol/g and bifunctional monomers having ring structures as shown in FIGS. 11A to 11D were dissolved in a negative liquid crystal A, and resultant mixed liquid crystals were injected and sealed in evaluation cells. The evaluation cells were fabricated with the molar ratio of the bifunctional monomers to lauryl acrylate varied. Other conditions for fabrication followed those for Embodiment 2-1, and two glass substrates having ITO films formed thereon as electrodes were used for an evaluation cell and were combined with a cell thickness of 4.25 μm. The substrates used had no alignment film formed thereon and were irradiated with ultraviolet rays of 1500 mJ/cm² on surfaces thereof.

Results of evaluation of voltage holding ratio in a holding period of 1.67 s and vertically aligning properties after irradiation with ultraviolet rays of 9000 mJ/cm² were the same as those in FIG. 7 in the first mode for carrying out the invention. A holding ratio of 1.0 is the value of a holding ratio in a saturated state. As illustrated, the voltage holding ratio gradually increased with the ratio of the bifunctional monomers, and saturation was substantially reached at a ratio in the range from about 7:1 to 6:1 for any of the materials. However, vertically aligning properties gradually deteriorated on the contrary, and some regions appeared with insufficient verticalness around when the mixing ratio dropped below 10:1. The results were conflicting in that vertical alignment cannot be achieved under conditions that allow the best holding ratio to be achieved.

A similar experiment was conducted with the monomers replaced with monomers having structures as shown in FIGS. 10A to 10D which had a ring structure between alkyl chains. FIG. 14 shows the result. The abscissa axis of FIG. 14 represents mixing ratios between the monomer materials in the present mode for carrying out the invention and the bifunctional monomers, and the ordinate axis represents relative holding ratio. Referring to the symbols above the horizontal arrows in the figure, the circle represents a region of mixing ratios in which vertical alignment could be achieved; the triangle represents a region of mixing ratios in which horizontal alignment partially remained; and the cross represents a region of mixing ratios in which horizontal alignment remained as it was. As shown in FIG. 14, while no significant change was observed in the process of the change in the voltage holding ratio, vertical alignment could be achieved in an increased range to allow both of the voltage holding ratio and vertical alignment to be achieved at a high level which had not been achievable so far.

As described above, since the use of the present mode for carrying out the invention eliminates the need for an alignment film forming step for liquid crystal displays, in particular, vertical alignment type displays represented by MVA types, a significant cost reduction can be achieved.

Further, a liquid crystal alignment control layer can be easily formed even on an ultra-large mother glass which cannot be sufficiently handled with alignment film printing apparatus according to existing methods without being affected by the size of the same. The invention also makes it possible to provide liquid crystal displays utilizing substrates which are difficult to print such as substrates having great irregularities and substrates having curved surfaces.

Third Mode for Carrying Out the Invention

A liquid crystal display and a method of manufacturing the same in a third mode for carrying out the invention will now be described with reference to FIGS. 15A, 15B and 16. In the present mode for carrying out the invention, a method will be described which is more effective than methods in the related art in reducing or completely suppressing white lines visually perceived in domains that remain in horizontal alignment instead of being vertically aligned (see FIGS. 15A and 15B). It has been difficult to suppress the generation of white lines at a process of forming a resin film on a liquid crystal panel sandwiching a liquid crystal layer including a polymeric material by irradiating the panel with light. The difficulty originates in the fact that when a system including a polymeric material is vertically aligned as a result of a reaction with the irradiating light, the tilt of liquid crystal molecules that stand up from a horizontal position greatly varies between adjoining regions to leave some horizontally aligned regions.

Close studies and trials revealed that white lines can be reduced to a level lower than that achievable with methods in the related art or completely suppressed by making tilt differences small between regions that are uniformly reacting in the liquid crystal panel, i.e., regions that are being vertically aligned during the reaction of the system including the polymeric material to thereby eliminate regions left in horizontal alignment.

It has revealed that a role for a wavelength in the range from 300 nm to 400 nm in the reaction of the system including the polymeric material is very important. Further, it has revealed that liquid crystal display panels having high reliability with white lines reduced or eliminated can be manufactured by appropriately controlling the irradiation conditions that are, for example, the amount of dose of irradiation, accumulated intensity or ratio of long and short wavelength.

The use of manufacturing a liquid crystal display in the present mode for carrying out the invention makes it possible to suppress reduction of contrast attributable to white lines and to thereby provide an excellent liquid crystal display.

A detailed description will now be made with reference to specific embodiments and comparative examples.

Embodiment 3-1

A monofunctional monomer having acrylate groups at alkyl chains having 11 to 18 $CH_2$, a diacrylate type bifunctional monomer having a ring structure, and an initiator were dissolved in a negative liquid crystal A, and substrates which have no alignment film formed thereon and which has been subjected to a UV process on surfaces thereof are combined with a cell thickness of 4.25 μm to fabricate a 15-inch type panel. An observation of the state of alignment of the liquid crystal panel immediately after the fabrication revealed that there was fluid alignment and that both of horizontal alignment and vertical alignment existed. Thereafter, the liquid crystal panel was annealed for 30 minutes at 90° C. and was irradiated with unpolarized ultraviolet rays of 9000 mJ/cm$^2$ after being cooled. An observation of alignment revealed that vertical alignment had been achieved throughout the liquid crystal panel.

Figure 15B:
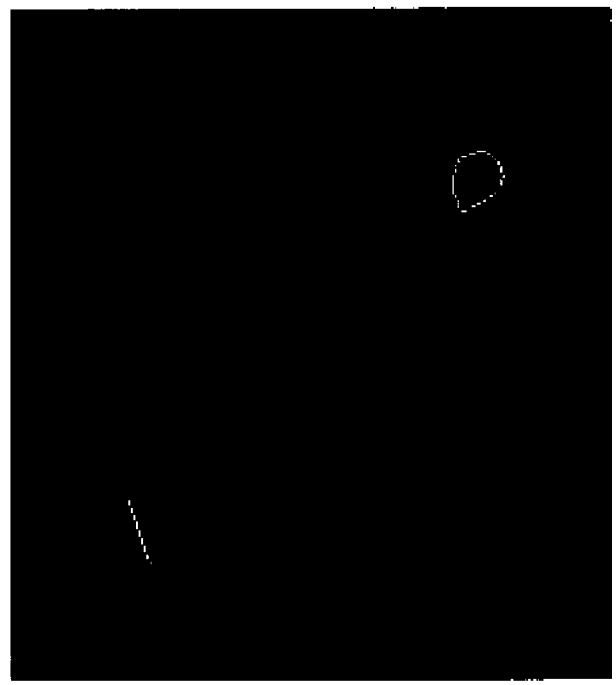
FIGS. 15A and 15B show a reduction of horizontally aligned domains visually perceived as white line in a vertically aligned region which is achieved by a method of manufacturing a liquid crystal display in a third mode for carrying out the invention.
Figure 15A:
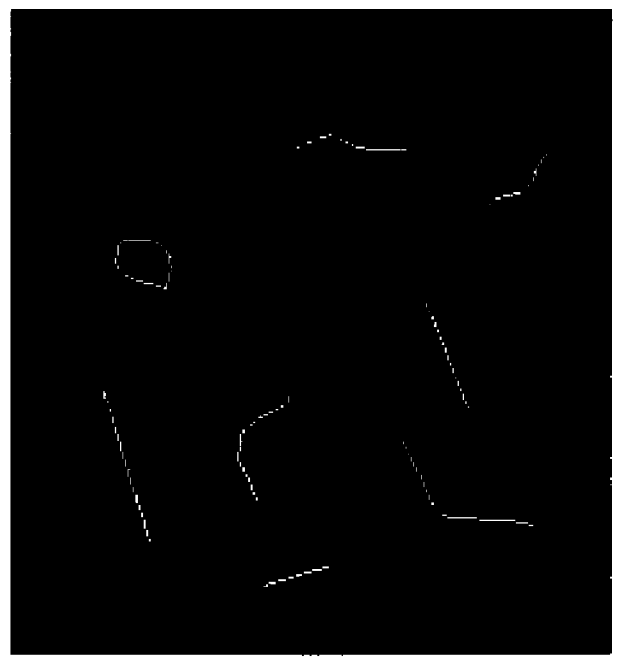

FIGS. 15A and 15B show states of generation of white lines on the panel thus fabricated depending on light sources. FIG. 15A shows state of white lines generated as a result of irradiation with 1 mJ/cm$^2$ of irradiation amount. FIG. 15B shows state of white lines generated as a result of irradiation with 9 J/cm$^2$ of irradiation amount. As shown in FIGS. 15A and 15B, when irradiated with 9 J/cm$^2$ or more of irradiation amount, the liquid crystal display panel could be fabricated with less white lines and display irregularities.

FIG. 16 shows the relationship between doses of irradiation and holding ratio thus identified. The abscissa axis of FIG. 16 represents doses of irradiation, and the ordinate axis represents voltage holding ratio. As shown in FIG. 16, doses of irradiation in the range 30000 J/cm$^2$ or less are suitable for irradiating light of wavelength in the range from 300 nm to 400 nm from the viewpoint of reliability, and irradiation in doses greater than the range results in low reliability.

Embodiment 3-2

In an experiment similar to Embodiment 3-1, reduction of reliability in the neighborhood of the injection hole could be prevented by using a visible light sealer. Reduction of reliability attributable to breakage of liquid crystal molecules including the polymeric material could be prevented by irradiating them with a wavelength in the range from 200 nm to 330 nm with intensity that was 0 to 20% or less of the intensity of wavelengths in the range from 200 nm to 800 nm. Further, reduction of reliability could be prevented by using multi-step irradiation in which a first cycle of irradiation was performed with light of low intensity and followed by second and later cycles of irradiation with higher intensity.

Embodiment 3-3

In an experiment similar to Embodiment 3-1, scanning irradiation was carried out. Before scanning irradiation was used, the luminance distribution of 15-inch type panel had a maximum variation of 30% in irradiation intensity, and the variation was reduced to 10% or less when scanning irradiation wad used. Scanning irradiation thus suppressed the generation of white lines and allowed the liquid crystal panel to be fabricated with less display irregularities.

Embodiment 3-4

An experiment similar to Embodiment 3-1 was conducted using substrates which had been subjected to plasma processing on surfaces thereof. The substrates allowed a liquid crystal panel having less display irregularities to be fabricated when compared to substrates which had not been subjected to any surface modifying process. Similarly, absorption of monomers onto the surfaces of the substrates was prevented by applying a voltage or heat when the liquid crystal including the polymeric material was injected to reduce the density distribution of the monomers, which allowed a liquid crystal panel to be fabricated with less display irregularities.

Embodiment 3-5

An experiment similar to Embodiment 3-1 was conducted using horizontally aligning spacers. The generation of white lines was not observed on a liquid crystal panel utilizing the horizontally aligning spacers. Further, the surface tension of the horizontally aligning spacers is desirably 40 dyn/cm or more. When a press process was performed in an experiment similar to Embodiment 3-1, white lines could be reduced.

As described above, since the use of the present mode for carrying out the invention eliminates the need for an alignment film forming step for liquid crystal displays, in particular, vertical alignment type displays represented by MVA types, a significant cost reduction can be achieved.

Further, a liquid crystal alignment control layer can be easily formed even on an ultra-large mother glass which cannot be sufficiently handled with alignment film printing apparatus according to existing methods without being affected by the size of the same. The invention also makes it possible to provide liquid crystal displays utilizing substrates which are difficult to print such as substrates having great irregularities and substrates having curved surfaces.

Fourth Mode for Carrying Out the Invention

A liquid crystal display and a method of manufacturing the same in a fourth mode for carrying out the invention will now be described with reference to FIGS. 17A to 36C. FIGS. 17A to 17F schematically illustrate LCD manufacturing processes according to the related art. According to TN types and MVA types in the related art, an alignment film 30 is formed on a transparent substrate 21 made of glass or plastic as shown in FIG. 17A (FIG. 17B). As occasions demand, a rubbing process is performed in which the alignment film 30 is rubbed with a roller around which a cloth is wound as shown in FIG. 17C. Then, another transparent substrate 22 which has been subjected to similar processes is provided opposite to the transparent substrate 21 (FIG. 17D), and the substrates are combined with a seal material 31 applied to the peripheries thereof. Next, a liquid crystal 5 is injected through a liquid crystal injection hole that is an opening in part of the seal material 31 (FIG. 17E). The liquid crystal injection hole is then closed to complete the liquid crystal panel (FIG. 17F). A dispenser-injection method may be used for the injection of the liquid crystal instead of vacuum injection as described above.

Figure 1B:
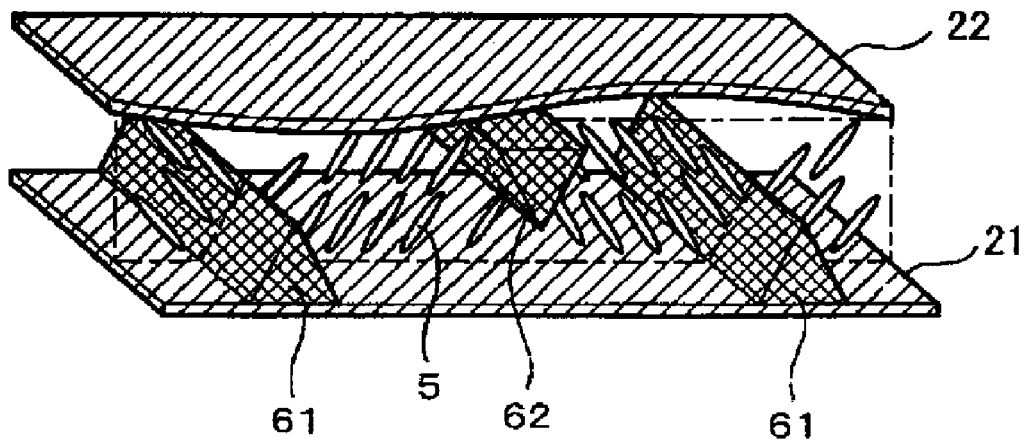
Figure 5C:
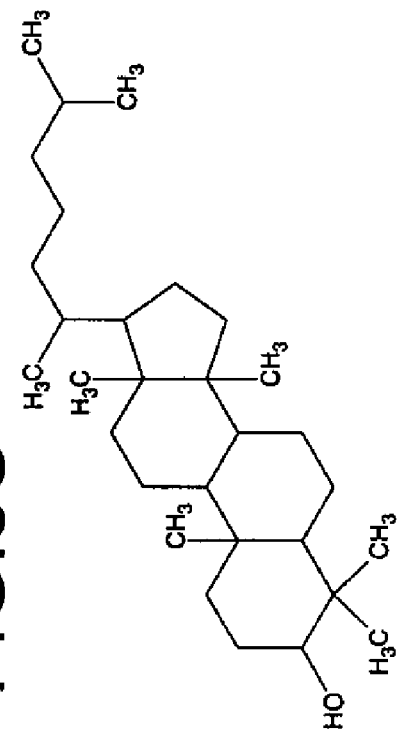
FIGS. 5A to 5D show examples of monofunctional monomer materials having a steroid skeleton to be mixed in a liquid crystal material of a liquid crystal display in the first mode for carrying out the invention.
Figure 5D:
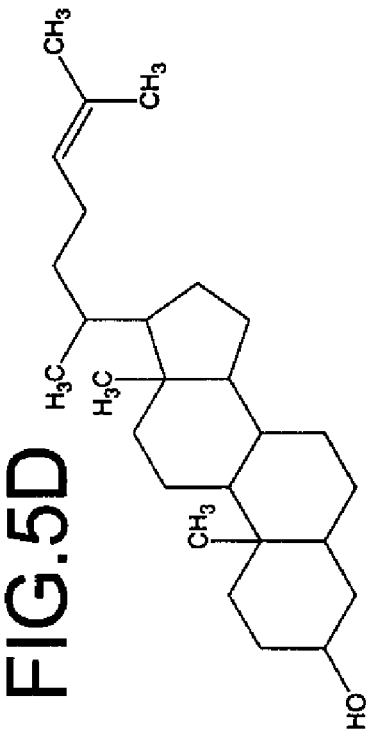
Figure 5A:
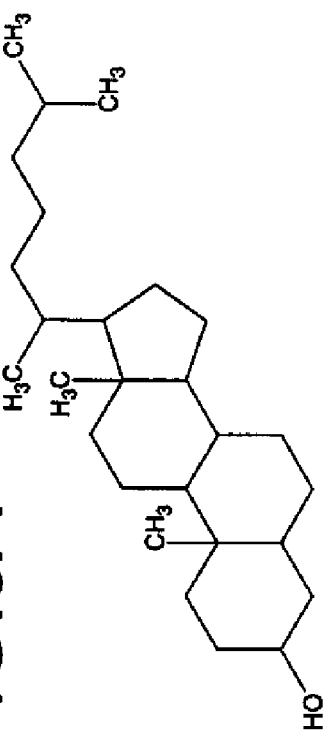
Figure 5B:
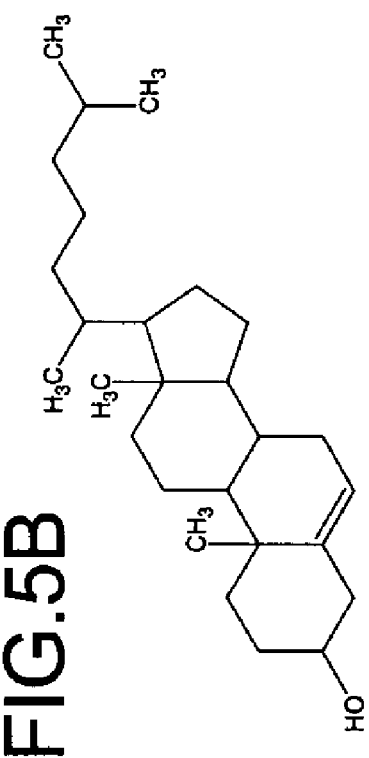
Figure 6A:
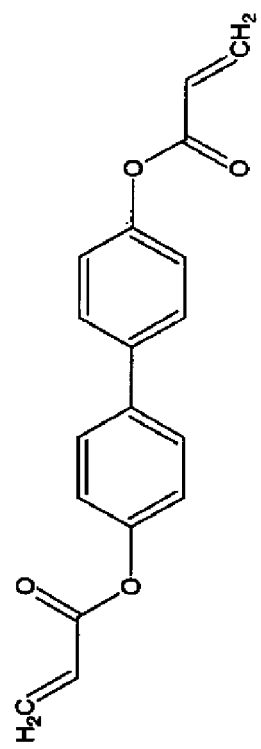
FIGS. 6A to 6D show examples of bifunctional monomer materials having a ring structure to be mixed in a liquid crystal material of a liquid crystal display in the first mode for carrying out the invention.
Figure 6B:
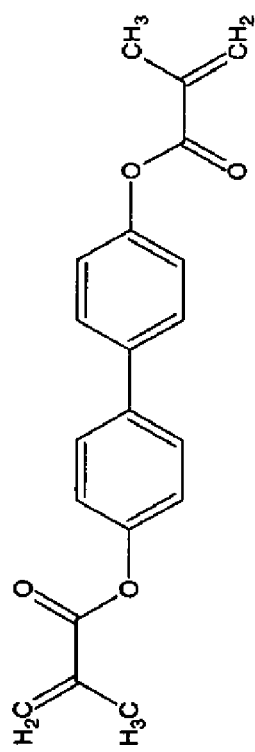
Figure 6C:
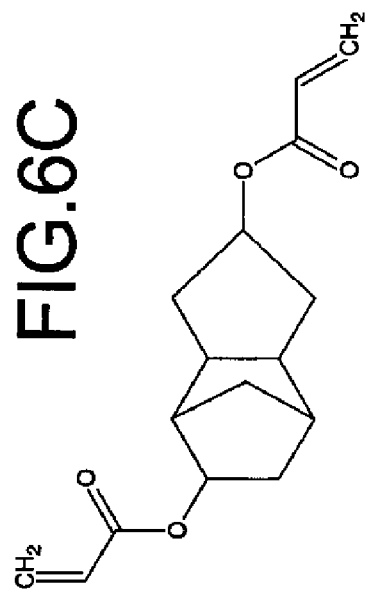
Figure 6D:
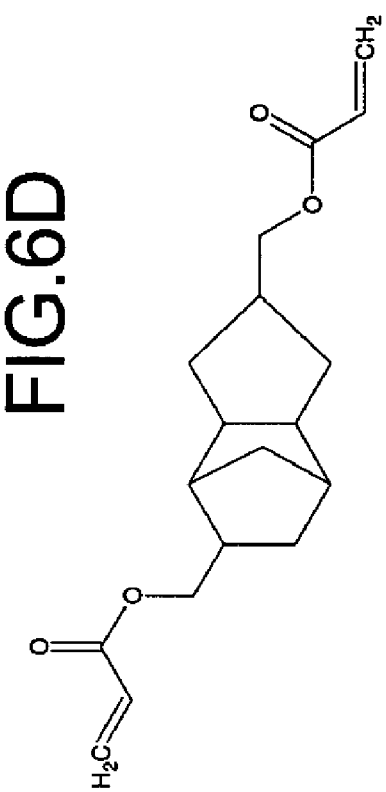

While the alignment film 30 is formed before the liquid crystal 5 is injected in the method shown in FIGS. 17A to 17F, a liquid crystal display panel has been invented in which a layer having an alignment controlling function is formed after the liquid crystal is injected as indicated in the above-described modes for carrying out the invention. FIGS. 18A to 18C schematically show a method for forming an alignment control layer after a liquid crystal is injected. First, two substrates 21 and 22 to which no alignment film 30 has been applied yet are combined so as to leave a predetermined cell gap between them (FIG. 18A). Next, as shown in FIG. 18B, a liquid crystal 5' which is a mixture of a liquid crystal material and alignment control materials such as ultraviolet-cured monomers or oligomers (hereinafter generally referred to as monomers) is injected to form an alignment control layer 30' in the layer including the liquid crystal as shown in FIG. 18C, thereby vertically aligning the liquid crystal molecules 5. The step of forming the alignment control layer 30' will be described in more detail using FIGS. 18B-1 to 18B-3. All of the figures show the neighborhood of the substrate 21. As shown in FIG. 18B-1, UV light is directed to a surface of the substrate. Thus, as shown in FIG. 18B-2, monomers M at the interface between the mixed liquid crystal 5' and the substrate 21 are polymerized into a polymer P1. As irradiation with UV light is continued further, a polymer P2 aligned vertically to the polymer P1 at the interface with the substrate is formed as shown in FIG. 18B-3, and the polymers P1 and P2 function as a vertical alignment control layer to align the liquid crystal molecules 5 vertically.

The above-proposed technique primarily relates to the alignment of a liquid crystal, and no mention has been made on electrical characteristics of a liquid crystal cell. In general, an active matrix LCD having switching elements such as TFTs (thin film transistors) must have a high voltage holding ratio at the liquid crystal cell thereof in light of its principle. The proposed technique in the related art has a problem in that display irregularities occur because a high voltage holding ratio cannot be maintained.

Figure 19:
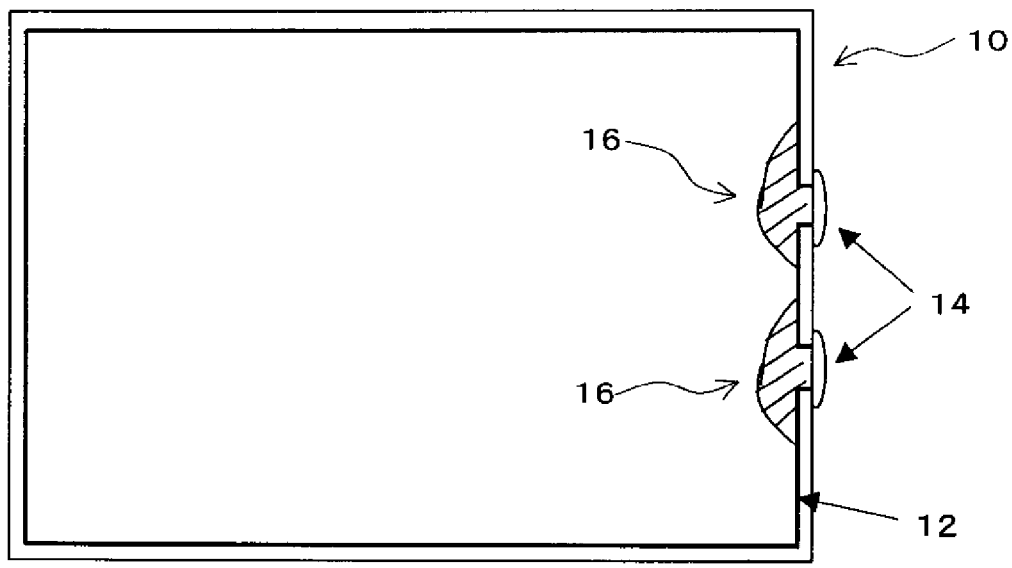
Figure 20:
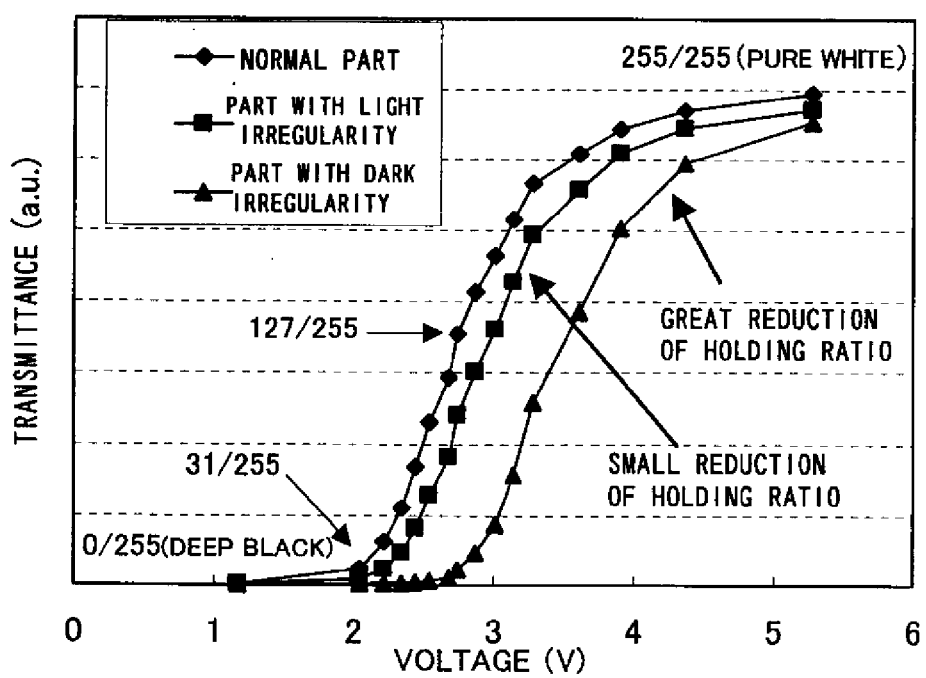
FIG. 20 is a graph showing a comparison between voltage-transmittance (gradation transmittance) characteristics of normal and abnormal parts at liquid crystal injection holes in the case of storage driving.

FIG. 19 shows display irregularities 16 which are observed when a liquid crystal display panel 10 of a 15-inch type active matrix LCD is turned on. For example, display in halftones may result in display irregularities 16 which are regions appearing darker than a central region of the screen, the irregularities spreading from liquid crystal injection holes 14 that are openings in a seal material 12. FIG. 20 is a graph showing a comparison between voltage-transmittance (gradation transmittance) characteristics of normal and abnormal parts in the case of storage driving. It will be understood that the voltage-transmittance characteristics of an abnormal part having a light display irregularity (the line connecting symbols ■) are shifted toward a high voltage side from those of a normal part (the line connecting symbols ♦) and the characteristics of another abnormal part having a dark display irregularity (the line connecting symbols ▲) are further shifted toward the high voltage side. This indicates that the voltage holding ratio of the liquid crystal is low in positions where display irregularities occur. An irregular part has a lower voltage holding ratio, the darker the part is. The present mode for carrying out the invention is aimed at improving the voltage holding ratio of a liquid crystal while aligning liquid crystal molecules vertically.

Figure 21B:
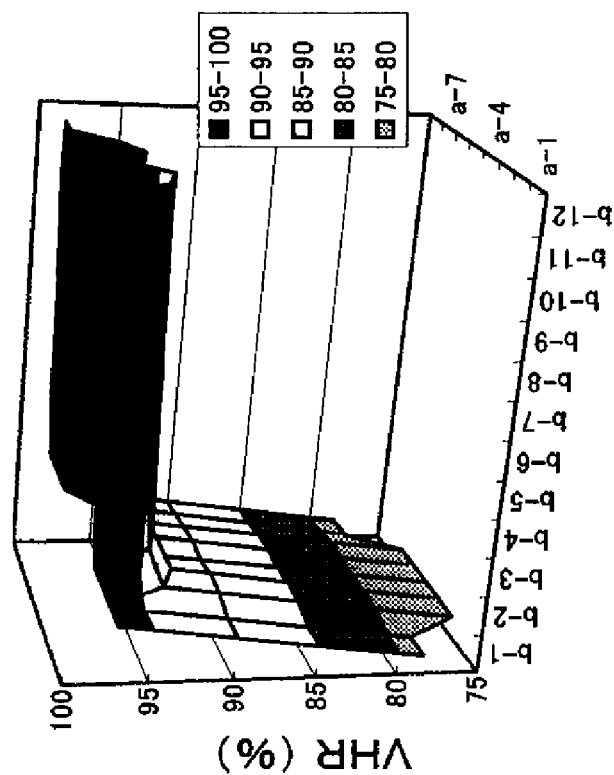
FIGS. 21A and 21B show the problem of display irregularities at liquid crystal injection holes using large panels (equivalent to a 15-inch type) for evaluation of voltage holding ratio which are formed by combining a pair of substrates having transparent electrodes.
Figure 21A:
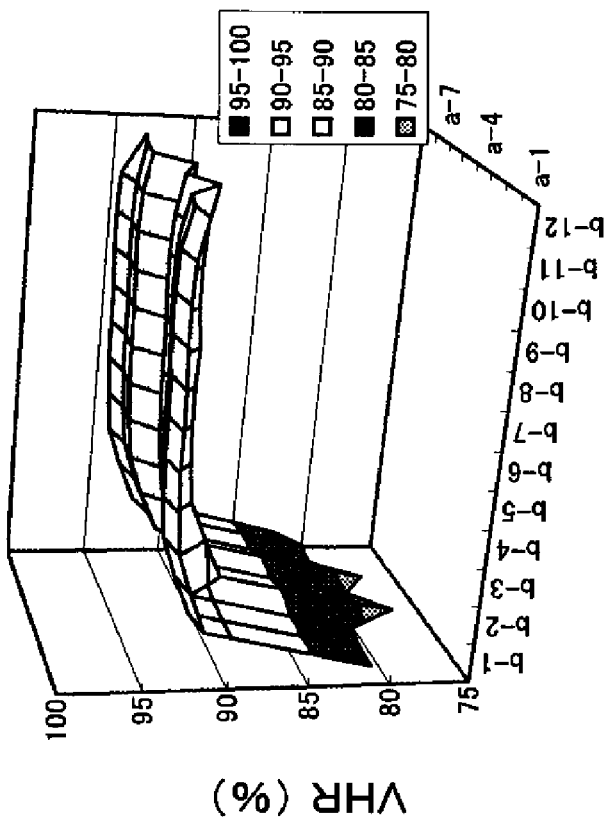

FIGS. 21A and 21B show the problem using large panels (equivalent to a 15-inch type) for evaluation of voltage holding ratio which are formed by combining a pair of substrates having transparent electrodes instead of a TFT substrate and a CF substrate. The figures show results of measurement of voltage holding ratio of liquid crystal cells in which a substrate A having a plurality of linear electrodes a-1 to a-n formed in an X-direction and a substrate B having a plurality of linear electrodes b-1 to b-n formed in a Y-direction are combined in a face-to-face relationship and in which the linear electrodes a and b are provided so as to form a matrix in combination with each other. FIG. 21A shows voltage holding ratio (VHR; %) measured on a liquid crystal layer after irradiating the same with UV having an irradiation energy of 300 mJ/cm$^2$, the layer being made of a liquid crystal material in which a polymerization initiator G to be described later is mixed in a monomer material D in an amount of 50% by weight (1% by weight of the liquid crystal material as a whole). FIG. 21B shows voltage holding ratio (VHR; %) measured on a liquid crystal layer after irradiating the same with UV having an irradiation energy of 300 mJ/cm$^2$, the layer being made of a liquid crystal material in which the polymerization initiator G to be described later is mixed in the monomer material D in an amount of 2.5% by weight (0.05% by weight of the liquid crystal material as a whole). Both of the figures indicate that the voltage holding ratio is low in the vicinity of an injection hole (in the vicinity of a position where the electrode a-4 in the X-direction and the electrode b-1 in the Y-direction intersect with each other).

Figure 22:
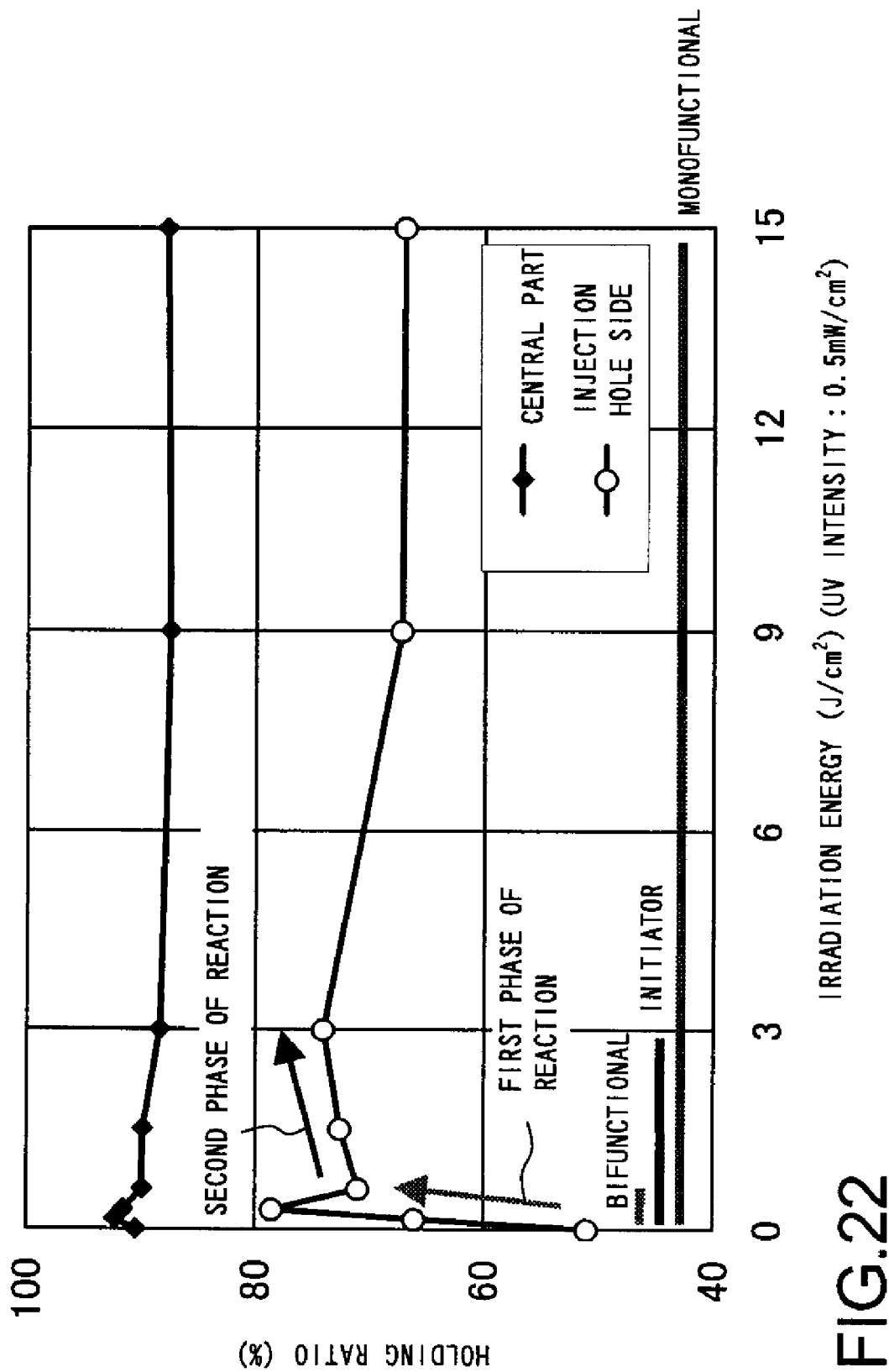
FIG. 22 shows a relationship between a UV irradiation step for a liquid crystal cell in a fourth mode for carrying out the invention and voltage holding ratio.

FIG. 22 shows a relationship between a UV irradiation step for a liquid crystal cell in the present mode for carrying out the invention and voltage holding ratio. The abscissa axis of the figure represents irradiation energy (J), and the ordinate axis represents voltage holding ratio (%). The liquid crystal material used is a liquid that is a mixture of a liquid crystal A (98% by weight), a monofunctional monomer D (1.825% by weight) (91.7% of which is unrefined), a bifunctional monomer B (0.125% by weight) and an initiator G (0.05% by weight). The intensity of the irradiating UV is 0.5 mW/cm$^2$. As shown in FIG. 22, voltage holding ratio change depending on the irradiation energy of light (which is ultraviolet rays in this case) with which the liquid crystal cell is irradiated. The line connecting symbols ○ in the figure represents changes in a voltage holding ratio near an injection hole depending on changes in the irradiating energy, and the line connecting symbols ◆ in the figure represents changes in a voltage holding ratio in a central part of the cell depending on the irradiating energy.

FIG. 22 also shows that the voltage holding ratio are low when the monomers which are alignment assisting materials present in the liquid crystal cell do not react or react insufficiently. The amount of residual monomers can be easily analyzed by disassembling the liquid crystal cell to collect the liquid crystal from substrate surfaces using an organic solvent and analyzing it using gas chromatography. As indicated by the three straight lines at the bottom of FIG. 22, the bifunctional monomer is consumed to leave no residue at a first phase of reaction and the polymerization initiator is consumed to leave no residue at a second phase of reaction. When the voltage holding ratio of the liquid crystal cell is reduced, the monofunctional monomer is left in a greater amount among the alignment assisting materials, and what is required is to cause a reaction of the monomer which has not reacted yet. Although the reaction of the monomer is promoted by increasing the irradiating energy, the survival rate will not become 0. Since deterioration of the liquid crystal material itself is caused by irradiation beside the problem of the reaction of the alignment assisting material, the irradiation must be performed within a required range.

Figure 23:
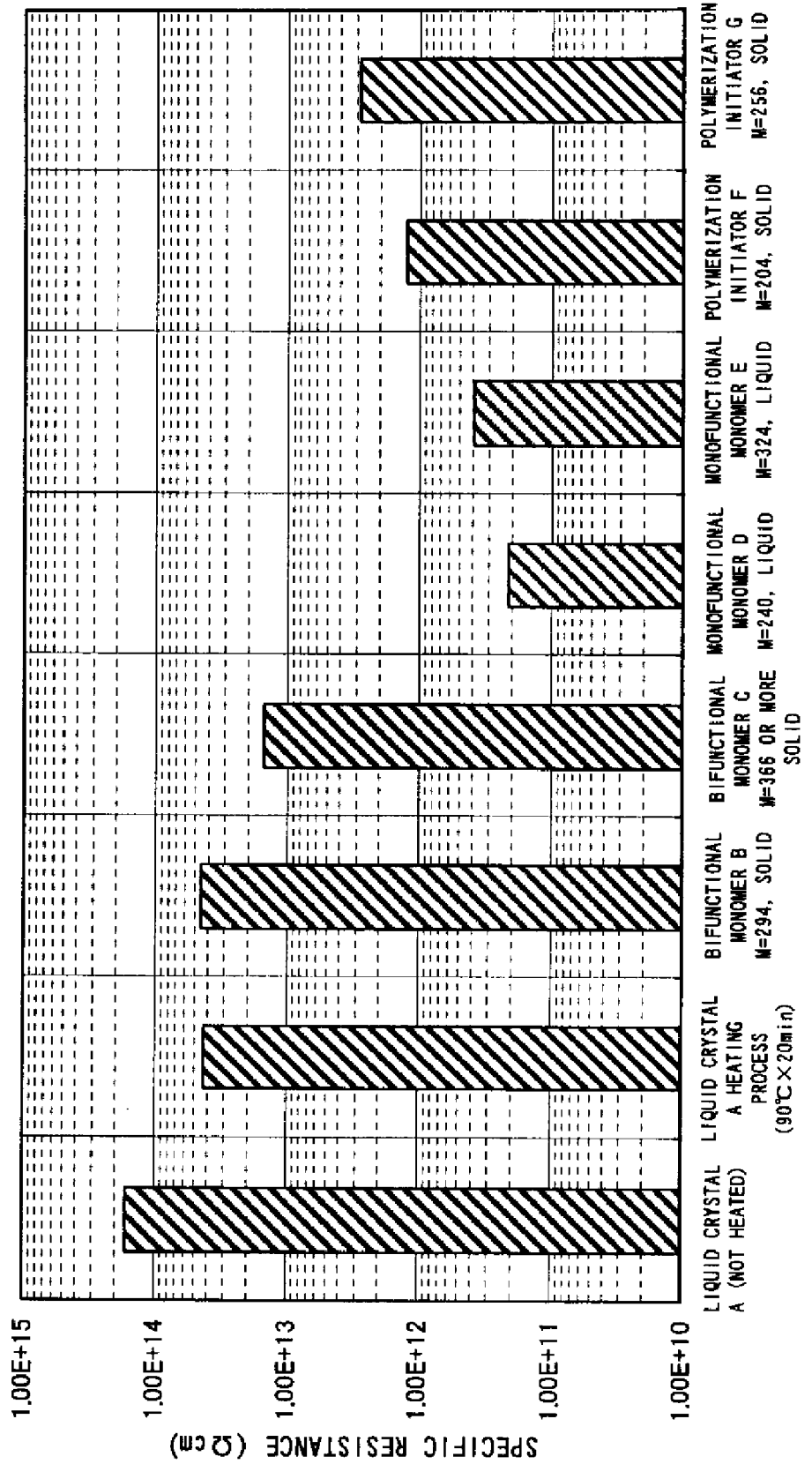
FIG. 23 is a graph for explaining how the specific resistance of a liquid crystal material is reduced by additives that are substances constituting alignment assisting materials mixed in the liquid crystal.

FIG. 23 is a graph for explaining how the specific resistance of the liquid crystal material is reduced by additives that are substances constituting the alignment assisting materials mixed in the liquid crystal. The abscissa axis represents materials in various conditions such as the liquid crystal A, monomers B, C, D and E, and polymerization initiators F and G. Specific resistances (Ωcm) are shown along the ordinate axis in logarithmic representation. As shown in FIG. 23, the liquid crystal A has a specific resistance of $1.67 \times 10^{14}$ Ωcm when it is not heated. The specific resistance of the liquid crystal A is decreased to $4.25 \times 10^{13}$ Ωcm when subjected to a heating process for 20 minutes at 90° C. The specific resistance of the liquid crystal A after the addition of each material shown in FIG. 23 is a value obtained at a dose that is 1% of the liquid crystal A and after performing a heating process for 20 minutes at 90° C.

It is apparent from FIG. 23 that there is a small reduction of the specific resistance when the bifunctional monomers B (M=294, solid, purity: 99.8%) and C (M=366 or more, solid) are added and that there is a great reduction when the monofunctional monomers D (M=240, liquid, purity: 91.8%) and E (M=324, liquid, purity: 99.2%) are added. It is well known that it is required to inject a liquid crystal material having a high specific resistance in order to achieve a high voltage holding ratio. It is therefore required to eliminate unreacted monofunctional monomers in a mixed liquid crystal.

The purity of a monomer has a significant influence on the voltage holding ratio. A monomer having a low purity includes a great amount of impurities, which can cause a great reduction of the voltage holding ratio. In the present embodiment, the purity of a monomer is represented in terms of GC (%) used in gas chromatography that is normally performed.

There is a certain limit on the improvement of the voltage holding ratio when it is pursued only by increasing the dose of irradiation. An analysis on reaction processes revealed that a bifunctional monomer is first consumed to come short relative to a monofunctional monomer under conditions employed in the related art. It was found that it is very much effective to increase the amount of a bifunctional monomer and to irradiate it with light sufficiently in order to reduce the survival rate of a monofunctional monomer.

Thus, it was found that a bifunctional monomer plays a very important role in causing efficient reaction (consumption) of a monofunctional monomer. FIGS. 24 to 29 show results of an examination on changes in the voltage holding ratio relative to doses of irradiation conducted by varying the amounts of bifunctional monomers. In each of the figures, the abscissa axis represents irradiation energy (J/cm$^2$), and the ordinate represents voltage holding ratio (%).

Figure 24:
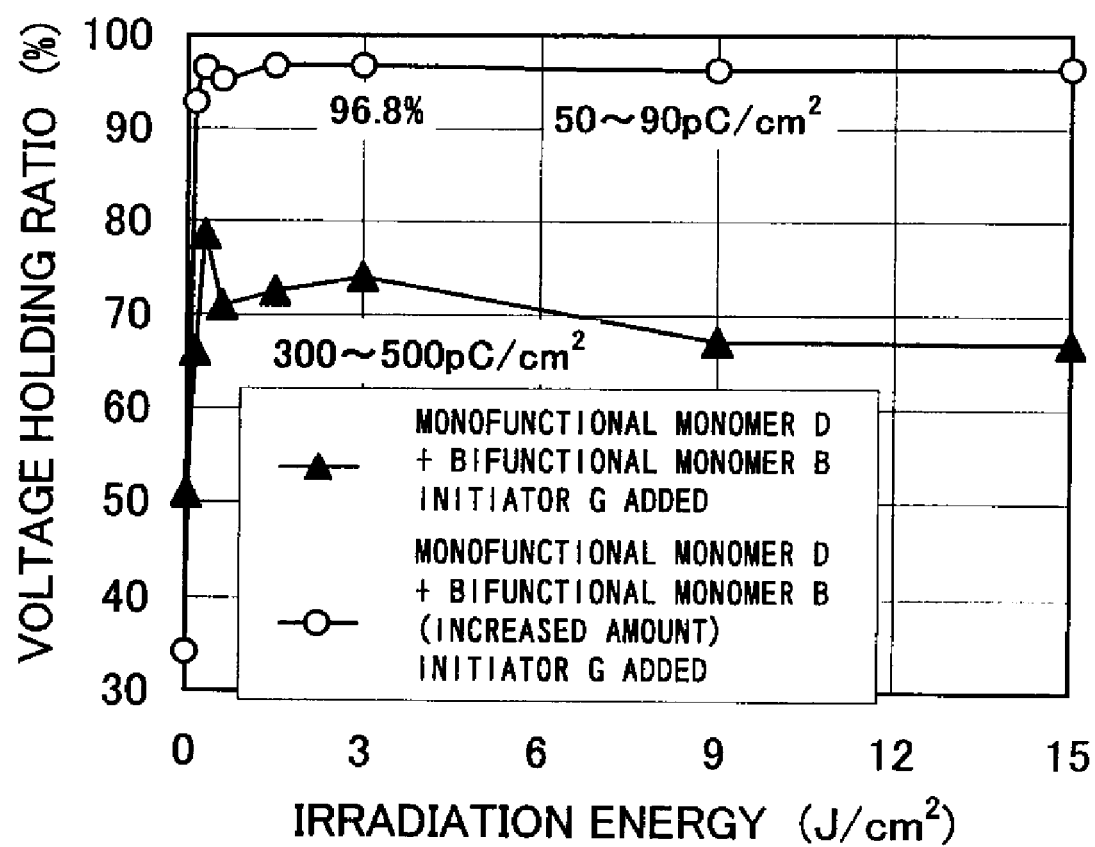
FIG. 24 shows a result of an examination of changes in voltage holding ratio relative to doses of irradiation light in the vicinity of a liquid crystal injection hole of a liquid crystal cell in the fourth mode for carrying out the invention, the examination being performed with the amount of a bifunctional monomer varied.

FIG. 24 shows an effect that occurs at a liquid crystal injection hole of a liquid crystal cell as a result of an increase in the amount of the bifunctional monomer B shown in FIG. 23. The line connecting symbols ▲ in the figure represents a result of an arrangement according to the related art using a liquid crystal material that is the liquid crystal A shown in FIG. 23 mixed with the monofunctional monomer D, the bifunctional monomer B in a normal amount, and the polymerization initiator G (M=256, solid, purity: 99.8%). The ion density is in the range from 300 to 500 pC/cm$^2$. The line connecting symbols ○ represents a result of an increase in the amount of the bifunctional monomer B. It is apparent that the voltage holding ratio was significantly improved to 96.8%.

Figure 25:
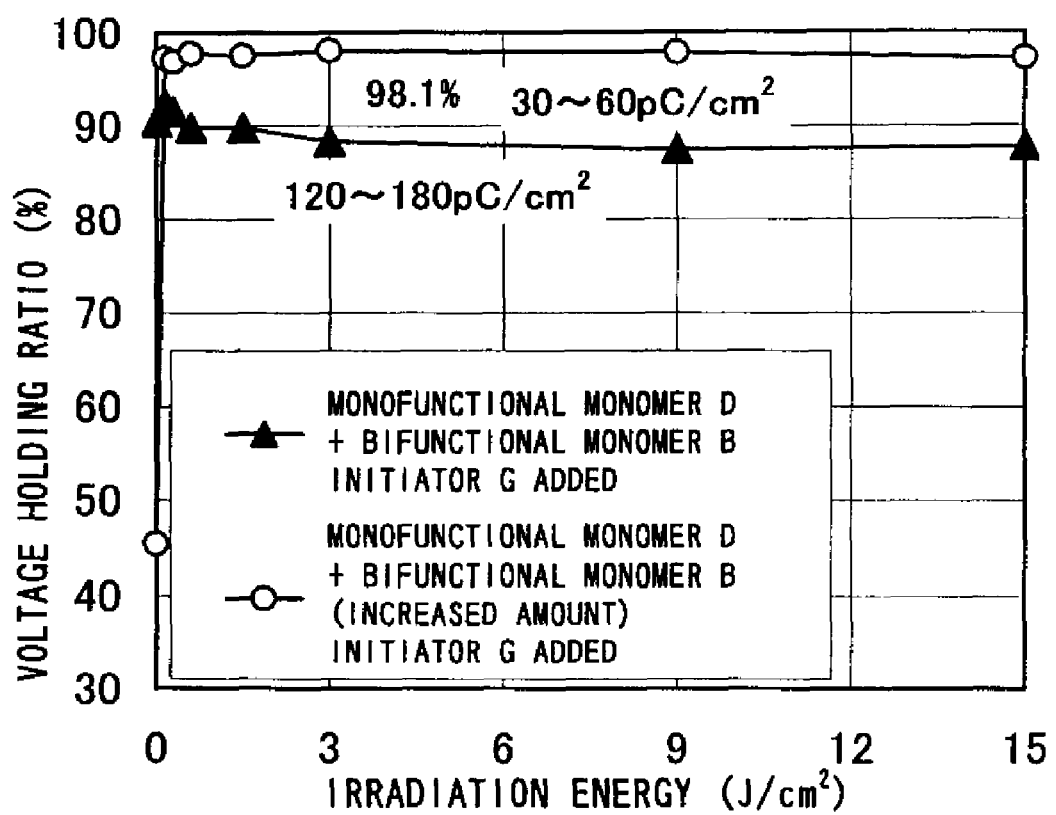
FIG. 25 shows a result of an examination of changes in voltage holding ratio relative to doses of irradiation light at a central part of the liquid crystal cell in the fourth mode for carrying out the invention, the examination being performed with the amount of the bifunctional monomer varied.

The ion density is in the range from 50 to 90 pC/cm². FIG. 25 is similar to FIG. 24 except that it shows results obtained in a central part of the liquid crystal cell. The ion density is in the range from 120 to 180 pC/cm² in the result represented by the line connecting symbols ▲ in the figure. The line connecting symbols ○ represents an improvement of the voltage holding ratio to 98.1%, the ion density being in the range from 30 to 60 pC/cm². Thus, a preferable voltage holding ratio is obtained by increasing the amount of the bifunctional monomer B also in the central part of the cell. The difference between voltage holding ratio at the liquid crystal injection hole and the central part can be reduced by increasing the amount of the bifunctional monomer B further.

Figure 26:
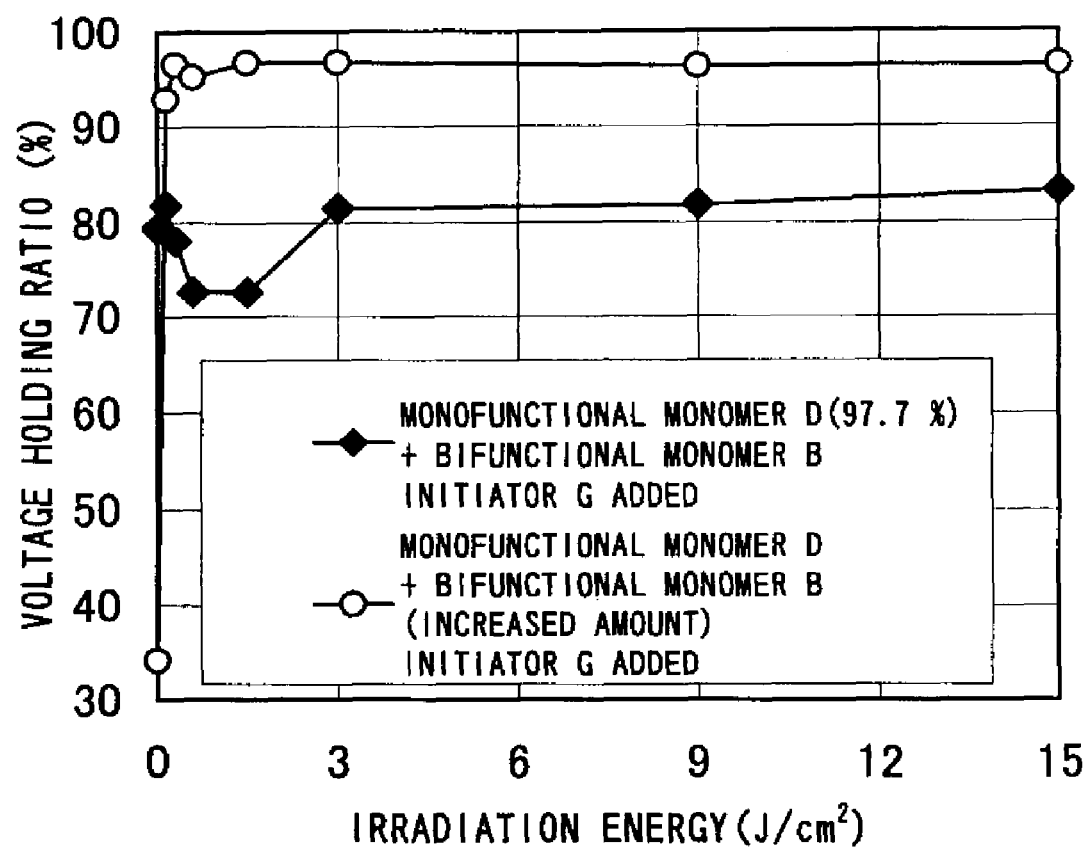
FIG. 26 is a graph showing a comparison between voltage holding ratio at the liquid crystal injection hole of the liquid crystal cell in the fourth mode for carrying out the invention, the holding ratio being achieved by increasing the amount of the bifunctional monomer B shown in FIG. 23 and increasing the purity of the monofunctional monomer D, respectively.
Figure 27:
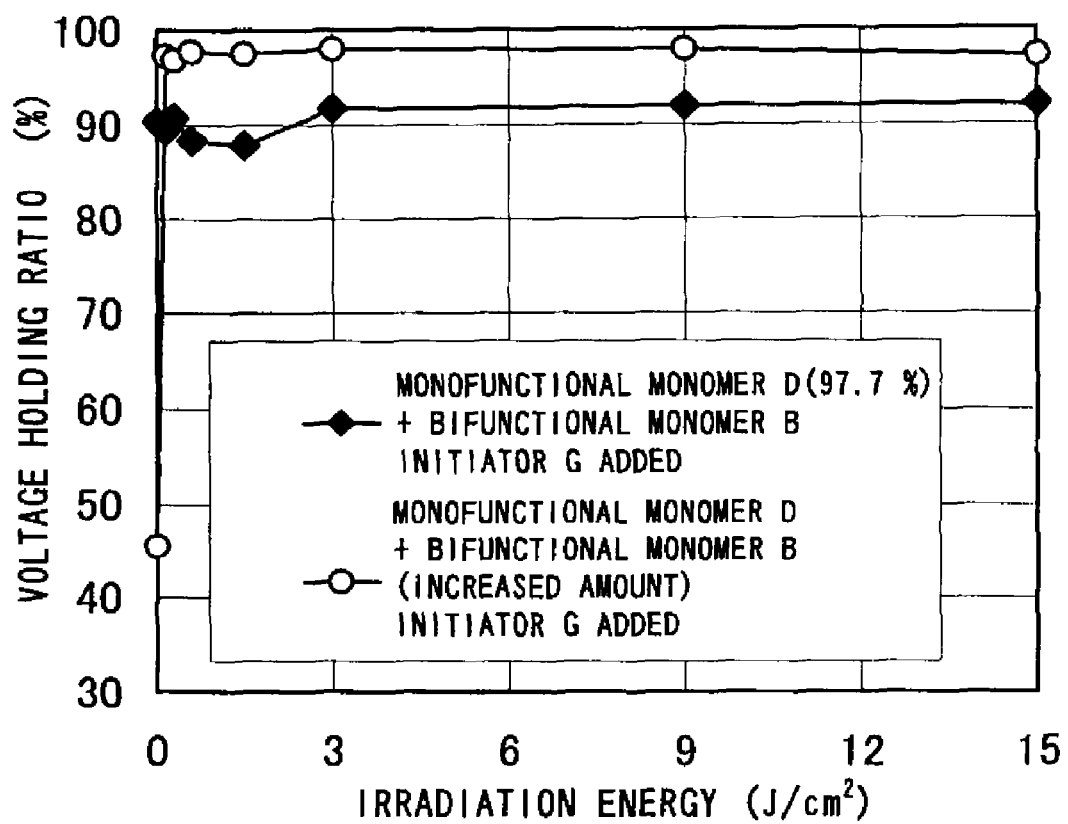
FIG. 27 is a graph showing a comparison between voltage holding ratio at the central part of the liquid crystal cell in the fourth mode for carrying out the invention, the holding ratio being achieved by increasing the amount of the bifunctional monomer B shown in FIG. 23 and increasing the purity of the monofunctional monomer D, respectively.

FIG. 26 is a graph showing a comparison between voltage holding ratio at the liquid crystal injection hole of the liquid crystal cell, the holding ratio being achieved by increasing the amount of the bifunctional monomer B shown in FIG. 23 and increasing the purity of the monofunctional monomer D, respectively. The line connecting symbols ♦ in the figure represents a result of the use of a liquid crystal material that is the liquid crystal A shown in FIG. 23 mixed with the monofunctional monomer D with an increased purity of 97.7%, the bifunctional monomer B in a normal amount, and the polymerization initiator G. The line connecting symbols represents a result of the use of a liquid crystal material that is mixed with the monofunctional monomer D with purity of 91.8%, the bifunctional monomer B in an increased amount, and the polymerization initiator G. It is apparent that a more significant improvement of the voltage holding ratio is achieved by increasing the amount of the bifunctional monomer than increasing the purity of the monofunctional monomer. FIG. 27 is similar to FIG. 26 except that it shows results obtained at the central part of the liquid crystal cell. A preferable voltage holding ratio is obtained by increasing the amount of the bifunctional monomer B also in the central part of the cell.

Figure 28:
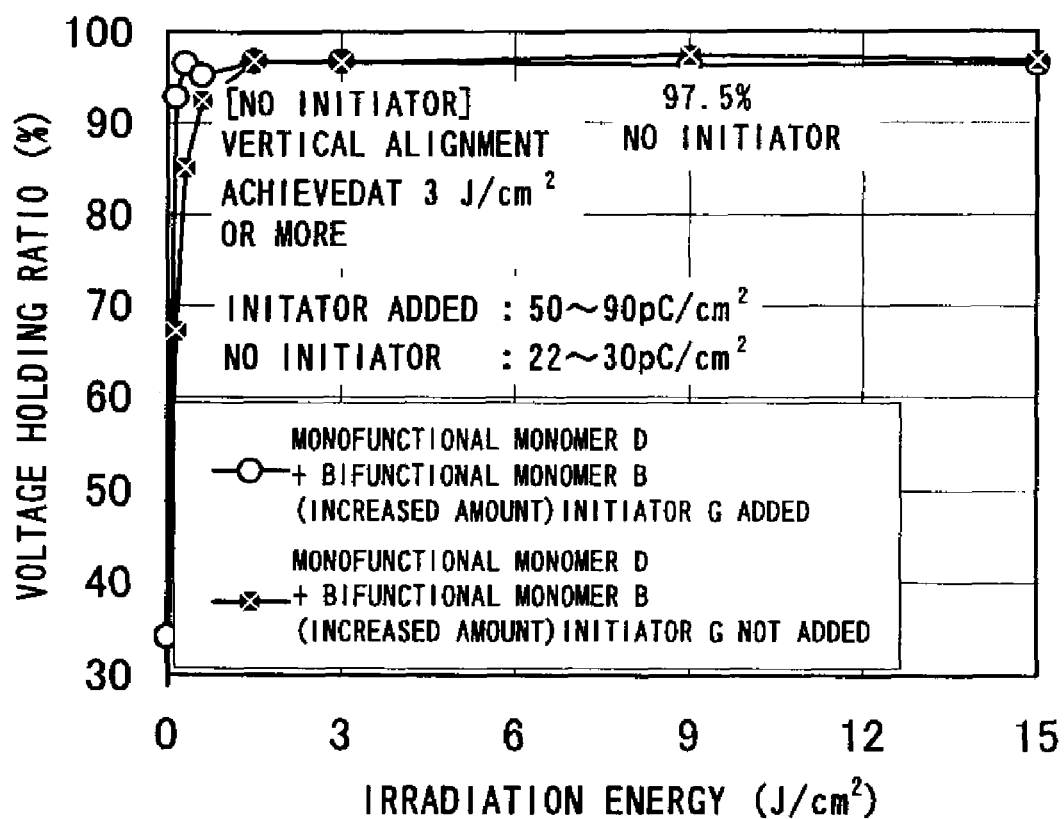
FIG. 28 shows differences between voltage holding ratio at the liquid crystal injection hole of the liquid crystal cell in the fourth mode for carrying out the invention depending on the presence and absence of the polymerization initiator, the amount of the bifunctional monomer B being increased from that in FIG. 23.
Figure 29:
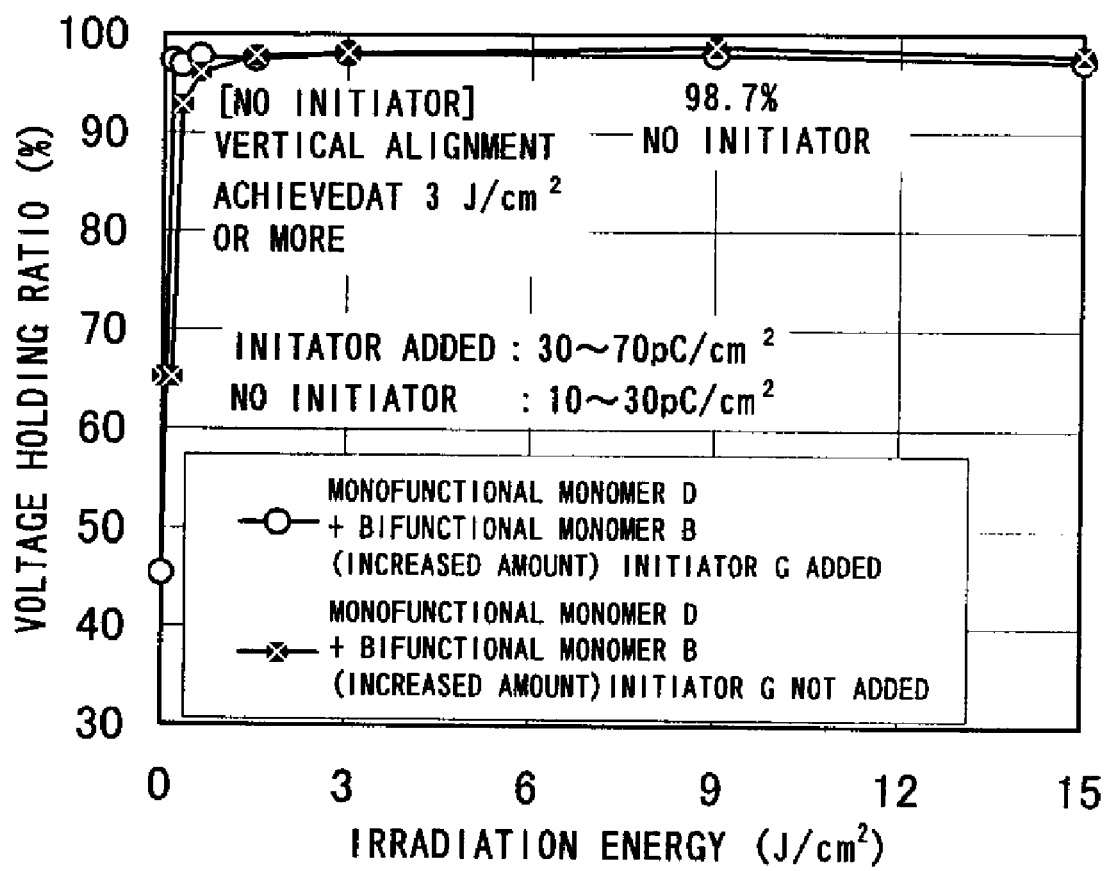
FIG. 29 shows a result of an examination of changes in voltage holding ratio relative to doses of irradiation light at the central part of the liquid crystal cell in the fourth mode for carrying out the invention depending on the presence and absence of the polymerization initiator, the amount of the bifunctional monomer B being increased from that in FIG. 23.

FIG. 28 shows differences between voltage holding ratio that depend on the presence and absence of the polymerization initiator, the amount of the bifunctional monomer B being increased from that in FIG. 23. The line connecting symbols × in the figure represents a result of the use of a liquid crystal material that is the liquid crystal A shown in FIG. 23 mixed with the monofunctional monomer D, the bifunctional monomer B with an increased amount, and no polymerization initiator. When no polymerization initiator is added, liquid crystal molecules are vertically aligned with an irradiation energy of 3 J or more. A voltage holding ratio of 97.5% is achieved at an irradiation energy of 9 J. The ion density is in the range from 22 to 30 μC/cm². The line connecting ○ represents a result of the use of a liquid crystal material that is the liquid crystal A mixed with the monofunctional monomer D, the bifunctional monomer B in an increased amount, and the polymerization initiator G. The line is not significantly different from the line connecting symbols × in the figure, which indicates that the presence or absence of the polymerization initiator does not significantly contribute to voltage holding ratio. The ion density is in the range from 500 to 90 pC/cm² when there is the polymerization initiator. FIG. 29 shows a result obtained at the central part of the liquid crystal cell, the result being similar to that shown in FIG. 28. Liquid crystal molecules are vertically aligned at an irradiation energy of 3 J or more when there is no polymerization initiator. A voltage holding ratio of 98.7% is achieved with an irradiation energy of 9 J. The ion density is in the range from 10 to 30 μC/cm². The ion density is in the range from 30 to 70 μC/cm² in the result represented by the line connecting symbols ○.

Figure 30:
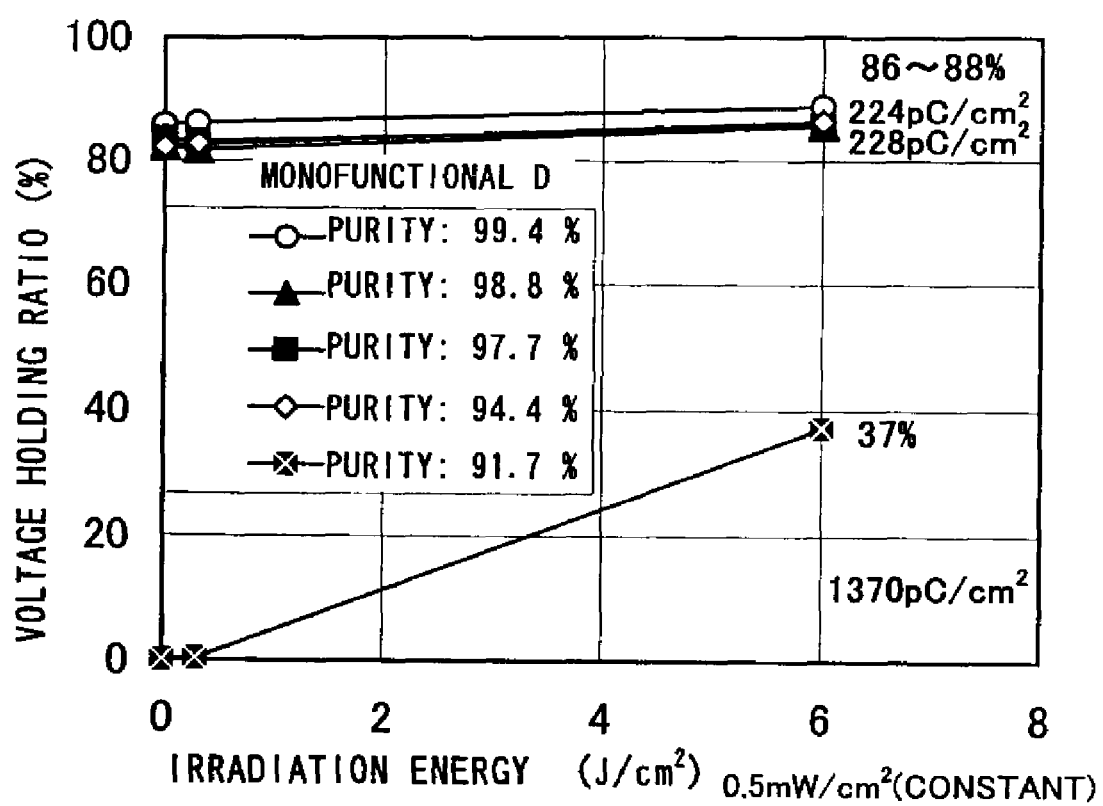
FIG. 30 shows a result of an examination on a relationship between the purity of a monofunctional monomer and voltage holding ratio at the injection hole of the liquid crystal cell in the fourth mode for carrying out the invention.
Figure 31:
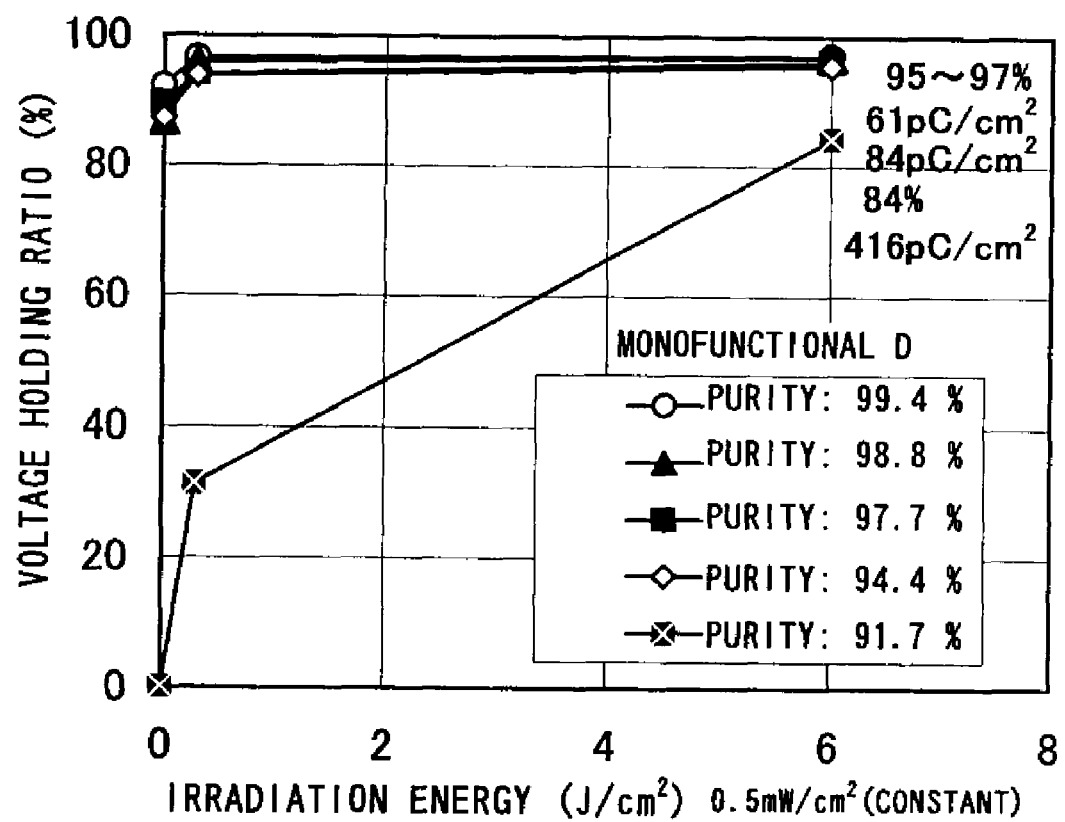
FIG. 31 shows a result of an examination on a relationship between irradiation energy and voltage holding ratio of the liquid crystal cell in the fourth mode of carrying out the invention depending on differences in purity between monofunctional monomers D, the examination having been conducted under the same conditions in FIG. 30 except that the amount of the bifunctional monomers B was increased by a factor of 2.4.
Figure 32:
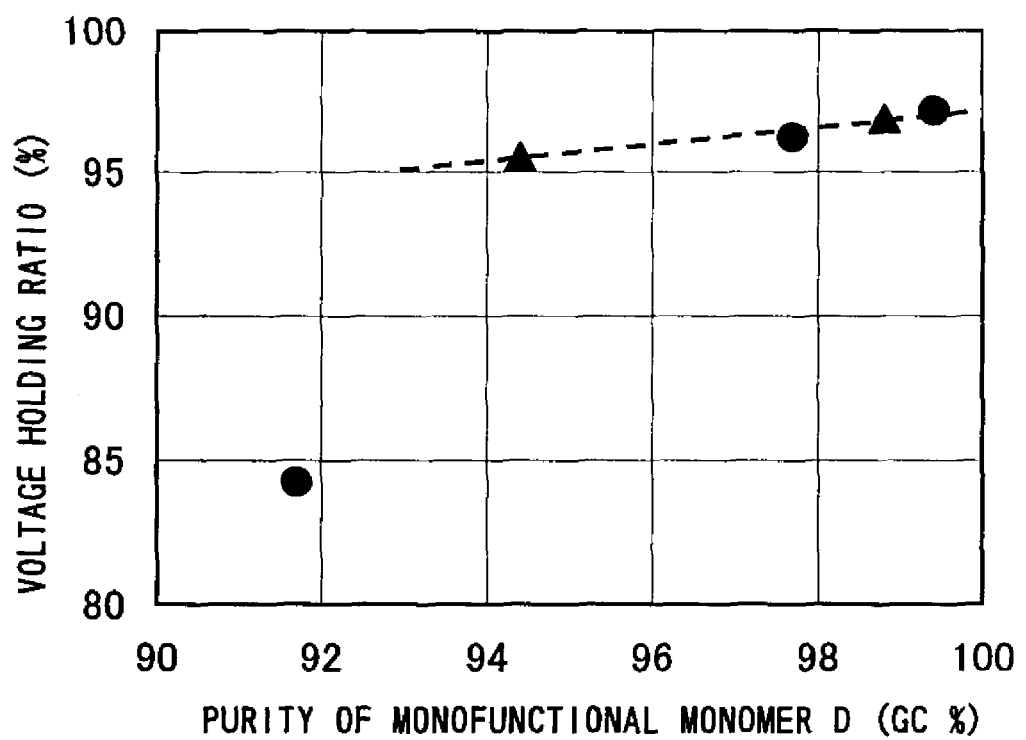
FIG. 32 is a graph of the liquid crystal cell in the fourth mode for carrying out the invention in which the purity (GC %) of monofunctional monomers D are plotted along the abscissa axis and voltage holding ratio (%) are plotted along the ordinate axis.

Any of FIGS. 30 to 32 show a result of an examination on a relationship between the purity of the monofunctional monomers and voltage holding ratio at an injection hole of a liquid crystal cell. The monofunctional monomers used in the present mode for carrying out the invention was acrylate liquids, and the height value of their purity was 99.4%. It was revealed that a monomer allows a higher voltage holding ratio to be achieved the higher the purity of the monomer and that monomers having purity of 98.5% or more are suitable for the purpose of eliminating irregularities at an injection hole. A mixed liquid crystal (alignment assisting material) preferably included 0% polymerization initiator in order to achieve a high voltage holding ratio and a low ion density.

A high voltage holding ratio was obtained when there was no unreacted residue of a bifunctional monomer and a polymerization initiator in a panel after vertical alignment was achieved even though there was some unreacted residue of a monofunctional monomer in the mixed liquid crystal. At this time, it was required that the reaction proceed until the ratio of the unreacted part of the monofunctional monomer (the amount of the residue of the monofunctional monomer in the liquid crystal layer in the panel divided by the amount of the monofunctional monomer added in the mixed liquid crystal) increases from 5% to 50%.

FIG. 30 shows a result of an examination on a relationship between irradiation energy and voltage holding ratio performed with the purity of the monofunctional monomer D shown in FIG. 23 varied. The line connecting symbols ○ in the figure represents a monofunctional monomer D having purity of 99.4%. The line connecting symbols ▲ in the figure represents a monofunctional monomer D having purity of 98.8%. The line connecting symbols ■ in the figure represents a monofunctional monomer D having purity of 97.7%. The line connecting symbols ◇ in the figure represents a monofunctional monomer D having purity of 94.4%. The line connecting symbols × in the figure represents a monofunctional monomer D having purity of 91.7%. In any case, the bifunctional monomer B is added in an amount that is twice the amount proposed in the related art, and the polymerization initiator G is also added. The examples shown in FIG. 30 were in an atmosphere at 50° C. for 1.67 seconds, and the irradiation energy density was 0.5 mW/cm². The monofunctional monomers D having impurity of 94.4% or more resulted in voltage holding ratio in the range from 86 to 88% and ion densities in the range from 228 to 224 pC/cm². The monofunctional monomer D having impurity of 91.7% resulted in a voltage holding ratio of 37% and an ion density of 1370 μC/cm². It is apparent from FIG. 30 that a monofunctional monomer D provides a higher voltage holding ratio, the higher the purity of the monomer.

FIG. 31 shows a result of an examination on a relationship between irradiation energy and voltage holding ratio depending on differences in purity between the monofunctional monomers D, the examination having been conducted under the same conditions except that the amount of the bifunctional monomers was increased by a factor of 2.4. In the figure, the lines connecting symbols ○, ▲, ■, ◇ and ×, respectively, indicate monofunctional monomers D which were the same in purity as the respective ones in FIG. 30. In any of the samples, the bifunctional monomer B was added in an amount that was 2.4 times that in FIG. 30, and the polymerization initiator G was also added. At an irradiation energy of 6 J/cm², the monofunctional monomers D having impurity of 94.4% or more resulted in voltage holding ratio in the range from 95 to 97% and ion densities in the range from 61 to 84 pC/cm². The monofunctional monomer D having purity of 91.7% resulted in a voltage holding ratio of 84% and an improved ion density of 416 pC/cm². FIG. 31 also indicates that a monofunctional monomer D results in a higher voltage holding ratio, the higher the purity of the monomer. FIG. 31 also indicates that it is preferable to increase the amount of the bifunctional monomer B and to use a monofunctional monomer D having high purity especially in the region of an injection hole.

FIG. 32 is a graph in which the purity (GC %) of monofunctional monomers D are plotted along the abscissa axis and voltage holding ratio (%) are plotted along the ordinate axis. The purity substantially linearly changed from 94.4% up to 99.4%, and changes in the voltage holding ratio were in the range from 97.2% to 97.5%.

Figure 33:
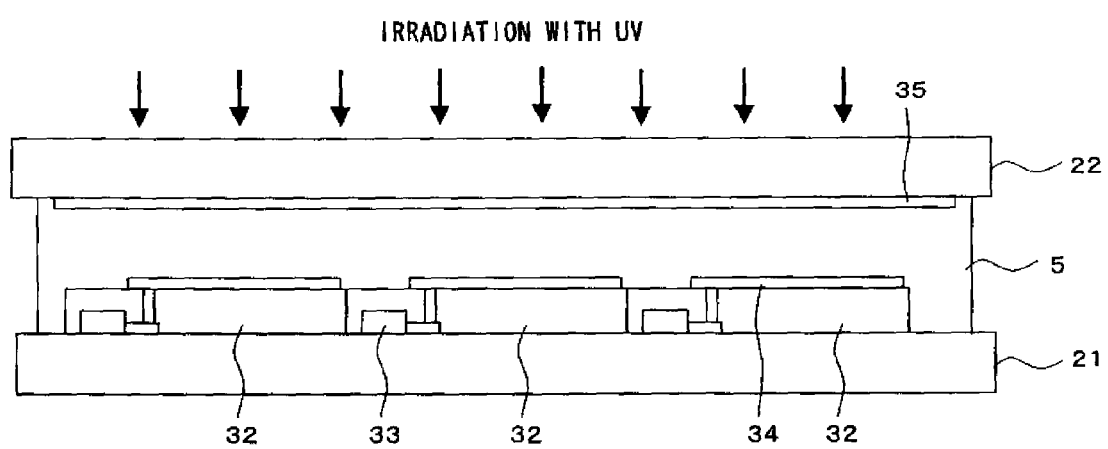
FIG. 33 shows a section of a liquid crystal panel suitable for use in the fourth mode for carrying out the invention.

FIG. 33 shows a section of a liquid crystal panel which is suitable for use in the present mode for carrying out the invention. In the liquid crystal panel shown in FIG. 33, color filter layers 32 are formed on one substrate 21 in addition to active elements 33 such as TFTs and pixel electrodes 34. Such elements and electrodes are not formed on another substrate 22 in a face-to-face relationship, and only an opposite electrode 35 is formed on the same. No light shield layer is formed at least in a display area. When the substrates 21 and 22 are combined with a predetermined cell gap left therebetween to seal a liquid crystal 5 which is mixed with a monomer, since there is no light-blocking member such as bus lines and BM (black matrix) layer, the liquid crystal 5 mixed with a monomer can be efficiently irradiated with UV light from the side of the substrate 22.

Figure 34:
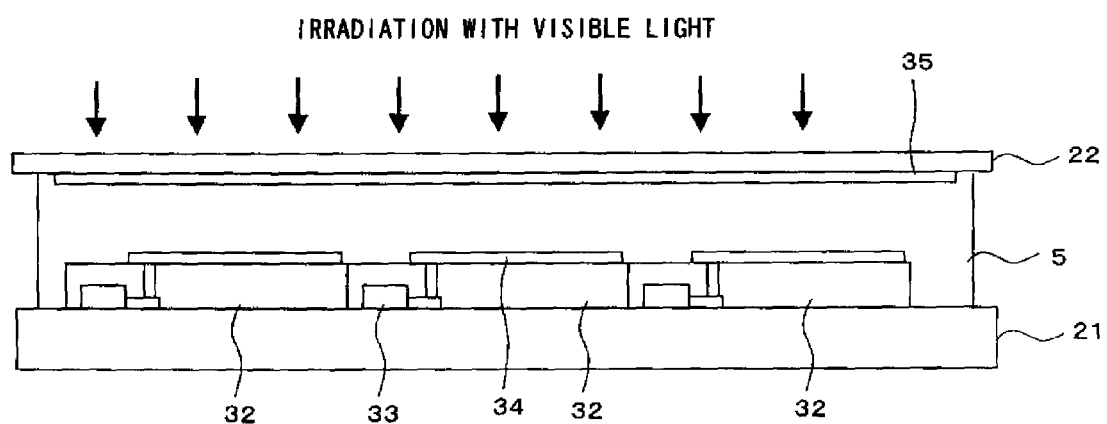
FIG. 34 shows a section of a liquid crystal panel suitable for use in the fourth mode for carrying out the invention.

FIG. 34 shows a section of a liquid crystal panel which is also suitable for use in the present mode for carrying out the invention. In the liquid crystal panel shown in FIG. 34, color filters 32 are formed on one substrate 21 in addition to active elements 33 such as TFTs and pixel electrodes 34. Another substrate 22 facing the above substrate is formed of a plastic material or film material, and only an opposite electrode 35 is formed on the substrate 22.

When the substrates 21 and 22 are combined with a predetermined cell gap left therebetween to seal a liquid crystal 5 which is mixed with a monomer, since there is no light-blocking member such as bus lines, the liquid crystal 5 mixed with a monomer can be efficiently irradiated with UV light from the side of the substrate 22. At this time, in case that the mixed crystal 5 includes a polymerization initiator, it is advantageous to use a polymerization initiator which has high light-absorbing properties in the region of visible light. Since irradiation with ultraviolet rays is not preferable to prevent deterioration of the plastic or film substrate, the mixed crystal 5 is irradiated with visible light from the side of the substrate 22, and the mixed crystal 5 is thus efficiently irradiated with light.

Figure 35A:
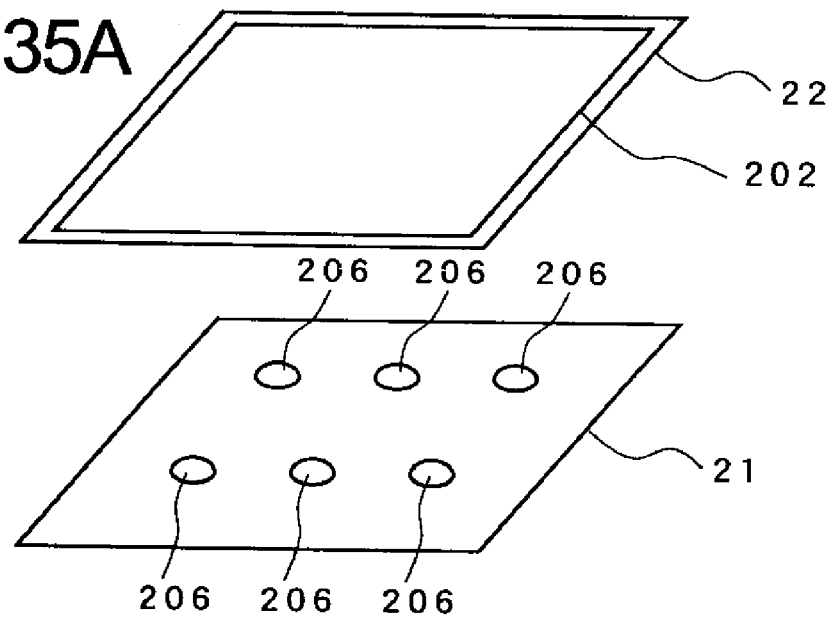
FIGS. 35A to 35C show steps of manufacturing a liquid crystal display panel by employing a dispenser injection method suitable for use in the fourth mode for carrying out the invention.
Figure 35B:
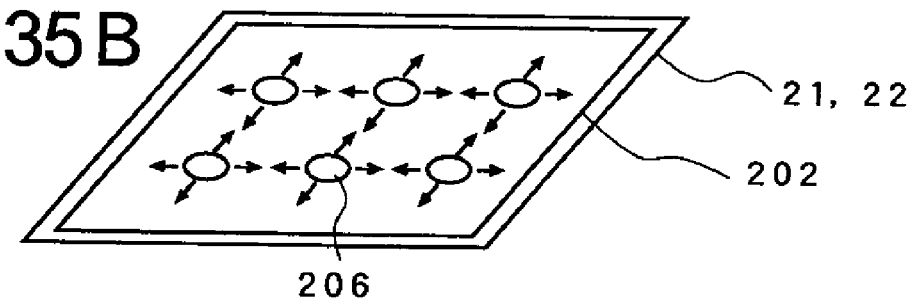
Figure 35C:
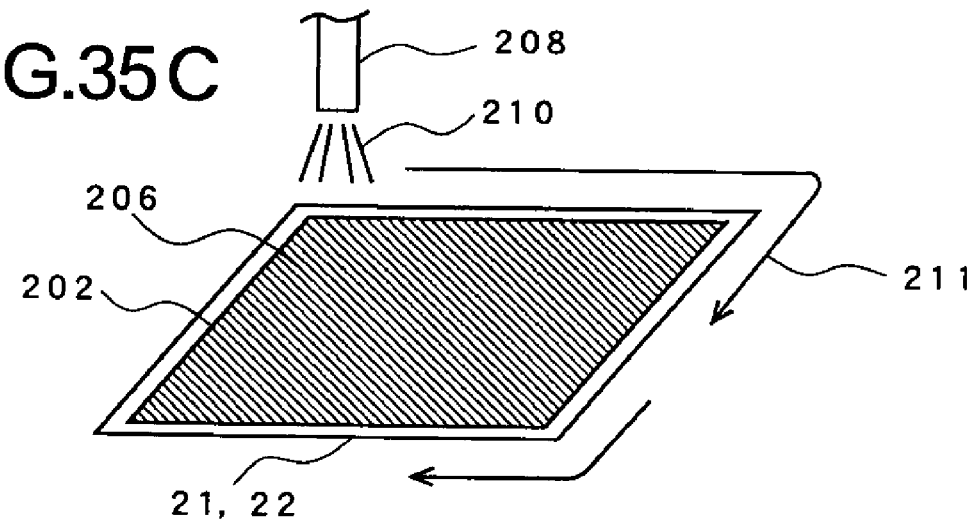

The liquid crystal panel in the present mode for carrying out the invention is suitable for fabrication using the so-called dispenser injection method in which a mixed liquid crystal is dispensed to at least one substrate and another substrate is thereafter combined with the same. Steps for manufacturing a liquid crystal display panel according to the dispenser injection method will be briefly described with reference to FIGS. 35A to 35C. First, as shown in 35A, a liquid crystal 206 is dispensed from a liquid crystal dispenser which is not shown to a plurality of positions on a surface of an array substrate 21 having switching elements such as TFTs and color filters formed thereon. Next, an opposite substrate 22 is aligned with and bonded to the array substrate 21, the opposite substrate having a common electrode formed in a display area thereof and having a UV seal material 202 applied around the display area which is cured when irradiated with ultraviolet rays (UV). This step is performed in vacuum. When the combined substrates are then returned into the atmosphere, the liquid crystal 206 between the combined array substrate 21 and the opposite substrate 22 is dispersed by the atmospheric pressure as shown in FIG. 35B. Then, the seal material 202 is irradiated with UV light by a UV light source 208 that is moved in a moving direction 211 along the region where the seal material 202 is applied as shown in FIG. 35C, whereby the seal material 202 is cured.

The use of the dispenser injection method in panel manufacturing steps is strongly desired because it provides the possibility of a reduction in the panel manufacturing cost and an improvement in mass productivity for a first reason that it allows a significant reduction in the amount of the liquid crystal material used and a second reason that it allows a reduction in the liquid crystal injection time in comparison to the vacuum injection method which has been widely used for panel manufacture in the related art. The method is also advantageous in that it eliminates the need for liquid crystal injection holes 14 that are openings in a seal material 12 as shown in FIG. 19.

Figure 36A:
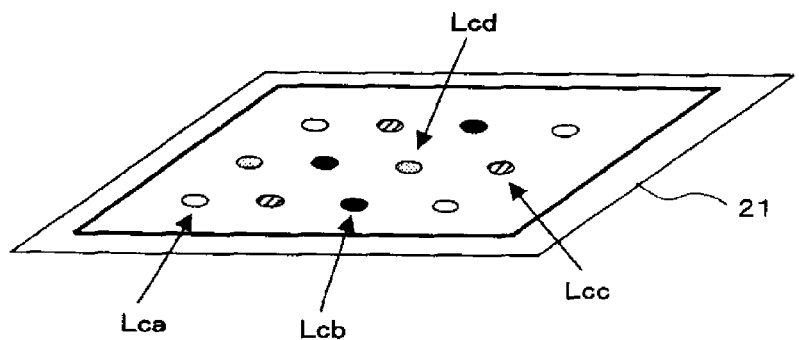
FIGS. 36A to 36C illustrate manufacture of a liquid crystal panel by dispensing two or more kinds of mixed liquid crystals instead of one kind of mixed liquid crystal by employing a dispenser injection method suitable for use in the fourth mode for carrying out the invention.

The use of the dispenser injection method makes it possible to fabricate a liquid crystal panel by dispensing two or more kinds of mixed liquid crystals instead of one kind of mixed crystal. For example, as shown in FIG. 36A, a mixed liquid crystal dispensed may comprise a liquid crystal Lca which is a liquid crystal material including no alignment assisting material, a liquid crystal Lcb which is a mixture of a liquid crystal material and a monofunctional monomer, a liquid crystal Lcc which is a mixture of a liquid crystal material and a bifunctional monomer, a liquid crystal Lcd which is a mixture of a liquid crystal material, a monofunctional monomer, and a bifunctional monomer and a liquid crystal Lce which is a mixture of a liquid crystal material and a polymerization initiator. A liquid crystal panel having high reliability can be fabricated by at least two kinds or more among them.

Figure 36B:
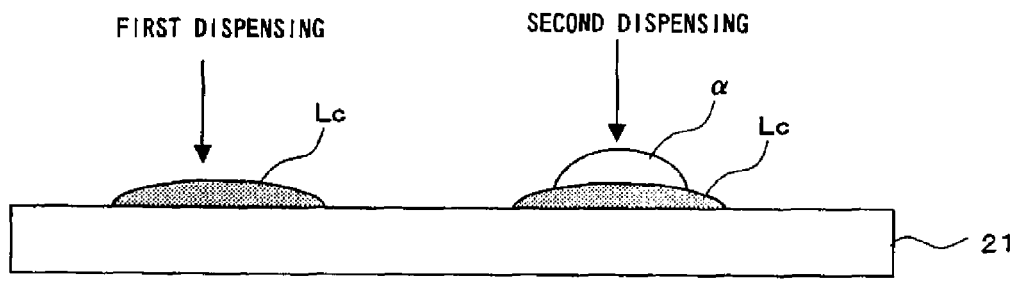

As shown in FIG. 36B, a liquid crystal material Lc may be dispensed onto a substrate 21 by a dispenser (not shown) containing only the liquid crystal material Lc (first dispensing), and a monomer material α may then be dispensed onto the liquid crystal material Lc on the substrate 21 by a dispenser (not shown) containing only the monomer material α (second dispensing) to mix them.

Figure 36C:
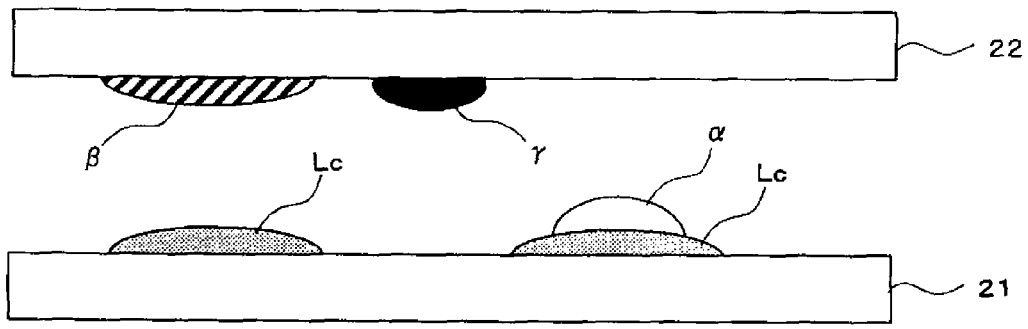

Alternatively, as shown in FIG. 36C, the liquid crystal material Lc alone or a liquid that is a mixture of the liquid crystal material Lc and the monomer material α may be dispensed; different monomer materials β and γ may be dispensed on an opposite substrate; and the substrates 21 and 22 may be combined to produce various kinds of mixed crystals.

A detailed description will now be made with reference to embodiments and comparative examples.

Embodiment 4-1

Each of a pair of glass substrate having transparent electrodes (ITO films) patterned thereon was washed. Spacers of 4.0 μm were dispersed on one glass substrate, and a thermoset seal was applied to another glass substrate by a dispenser. Those substrates were combined to fabricate an open cell. A liquid crystal A ($\Delta\in=-3.8$) and a resin were mixed in a ratio of 98:2 by weight. The resin was obtained by mixing a monofunctional monomer D and a bifunctional monomer B in a ratio of 15:1 by weight. A polymerization initiator G was mixed at 2.5% by weight of the total weight of the monofunctional monomer and the bifunctional monomer.

The mixed liquid crystal thus prepared was charged into the open cell using the vacuum injection method, and the injection hole was sealed with a visible light-cured resin. The liquid crystal cell was irradiated with ultraviolet rays (UV) having intensity of 0.5 mW/cm². The relationship between survivability against irradiation energy and voltage holding ratio was as shown FIG. 22. The liquid crystal cell was processed at each required irradiation energy, and voltage holding ratio were measured. The liquid crystal cell was disassembled, and the survival rate of each material was obtained from the collected liquid crystal using a gas chromatographic analysis. While the survival rate of each material became smaller the greater the irradiation energy, about 10% of the monofunctional monomer survived even when irradiated with an energy of 15 J/cm². In the range in which the survival rate greatly decreased, the voltage holding ratio increased greatly. However, the increase in the holding ratio became small when the change in the survival rate became small.

The voltage holding ratio were measured using an apparatus VHR-1 manufactured by TOYO Corporation, and the measurement was conducted at a measuring temperature of 50° C. and a holding time of 1.67 s.

Embodiment 4-2

FIG. 23 shows a result of an examination of the specific resistance of mixed crystals obtained by adding components of an alignment assisting material in a liquid crystal A. The liquid crystal A is the same as that used in Embodiment 4-1. When nothing was added, the liquid crystal had a specific resistance on the level of $10^{14}$ before being heated. When heated, the specific resistance decreased to the level of $10^{13}$. The reduction was on the same level as that of an ordinary mixed liquid crystal mixed with no alignment assisting material. The specific resistance of mixed liquid crystals AB and AC added with the bifunctional monomers B and C, respectively, decreased to the level of $10^{13}$, whereas the resistance of mixed liquid crystals AD and AE added with the monofunctional monomers D and E respectively decreased to the level of $10^{11}$.

Embodiment 4-3

An open cell similar to those in Embodiment 4-1 was fabricated. A mixed liquid crystal having a mixing ratio different from that of the mixed liquid crystal in Embodiment 4-1 was prepared. The mixed liquid crystal was obtained by mixing a liquid crystal A ($\Delta\varepsilon=-3.8$) with a resin in a ratio of 98:2 by weight. The resin was a mixture of a monofunctional monomer D and a bifunctional monomer B in a ratio of 15:2.4 by weight. A polymerization initiator G was mixed at 2.5% by weight of the total weight of the monofunctional monomer and the bifunctional monomer. The mixed liquid crystal thus prepared was charged and sealed in a way similar to that in Embodiment 4-1. The liquid crystal cell was irradiated with ultraviolet rays (UV) at an intensity of 0.5 mW/cm². FIGS. 24 to 29 show results of a comparison between the relationships of voltage holding ratio to irradiation energy with the results of the Embodiment 4-1. The voltage holding ratio could be improved at both of a central part and an injection hole of the liquid crystal cell. While the voltage holding ratio of the mixed liquid crystal in Embodiment 4-1 was on the level of 70%, the mixed liquid crystal of the present embodiment had an improved voltage holding ratio on the level of 97%. There was a difference between their ion densities, i.e., the density range of 300 to 500 µC/cm² could be reduced to 50 to 90 µC/cm².

Embodiment 4-4

An open cell similar to that in Embodiment 4-1 was fabricated. A mixed liquid crystal different from that in Embodiment 4-3 was prepared. The mixed liquid crystal of the present embodiment had a composition similar to the mixed liquid crystal in Embodiment 4-3 except that the polymerization initiator G was excluded. FIGS. 28 and 29 show results of an examination similar to that in Embodiment 4-3 carried out on the mixed liquid crystal excluding the polymerization initiator G thus prepared. The voltage holding ratio could be further improved from that in Embodiment 4-3 at both of the central part and injection hole of the liquid crystal cell. The voltage holding ratio could be improved to the level of 98% at both of the central part and injection hole. The ion density could be halved from that in Embodiment 4-3.

Embodiment 4-5

A mixed liquid crystal based on Embodiment 4-1 and a mixed liquid crystal based on Embodiment 4-3 were prepared. Both of the liquid crystals were obtained by mixing the liquid crystal A ($\Delta\varepsilon=-3.8$) with a resin in a ratio of 98:2 by weight. The weight ratios of the monofunctional monomer D and the bifunctional monomer B were the same as those in Embodiments 4-1 and 4-3, and the polymerization initiator G was also mixed in 2.5% by weight of the total weight. An examination was carried out by varying the purity of the monofunctional monomer D. Specifically, a monofunctional monomer D1 having purity of 91.7%, a monofunctional monomer D2 having purity of 94.4%, a monofunctional monomer D3 having purity of 97.7%, a monofunctional monomer D4 having purity of 98.8% and a monofunctional monomer D5 having purity of 99.4% were used. A comparison of voltage holding ratio similar to that in Embodiment 4-3 revealed that a higher voltage holding ratio can be achieved, the higher the purity of a monomer, as shown in FIGS. 30, 31 and 32.

Fifth Mode for Carrying Out the Invention

A liquid crystal display and a method of manufacturing the same in a fifth mode for carrying out the invention will now be described. Among active matrix type liquid crystal displays, reflective liquid crystal displays which can be light-weight, thin and less power-consuming are recently attracting attention and are disclosed in the above-mentioned Patent Document 2 and Patent Document 3, for example. Any of such displays employs a method utilizing a TN liquid crystal in which the liquid crystal is twisted and aligned by performing a rubbing process on an alignment film. However, in the method disclosed in the Patent Document 2 for example, a problem arises in that alignment control through rubbing is difficult to perform because irregularities are formed on reflective pixel electrodes.

It is an object of the present mode for carrying out the invention to solve the above-described problem, to simplify processing, to reduce the manufacturing cost, and to improve the yield of manufacture. A technique is used to control the alignment of a liquid crystal without using a rubbing process. Methods have been disclosed in Patent Document 4 and others in which processing is simplified by injecting a positive liquid crystal (a liquid crystal having a positive dielectric constant anisotropy) between horizontal alignment films which have not been subjected to an aligning process. However, such methods necessitate a step of injecting a liquid crystal material between substrates at a temperature equal to or higher than a temperature at which transition of the liquid crystal into an isotropic phase takes place. The methods also necessitate some limitations on manufacturing steps, the limitations being different from those in injecting methods in the related art and including a need for rapid cooling at a rate of 10° C./sec or more at the time of phase transition from the isotropic phase to the liquid crystal phase. Further, since a liquid crystal has a small pre-tilt angle in horizontal alignment, the stability of alignment at irregular electrodes as disclosed in Patent Document 2 is lower than that achievable with the rubbing method.

In the present mode for carrying out the invention, solid state properties of a vertical alignment film are controlled to provide a liquid crystal display which does not need an aligning process such as rubbing during injection at the room temperature similar to injection in the related art. The method will not cause any problem in aligning properties when used in a reflective liquid crystal display or transflective liquid crystal display having reflective electrodes in an unevenness configuration, to say noting of a transmissive liquid crystal display.

Referring to the technique specifically, in normal processing of a liquid crystal display utilizing the MVA method that is a VA type alignment control method originated with the applicant, it is necessary to form vertical alignment films mainly composed of polyamic acid or polyimide on TFT and CF substrates using the printing method or spin coat method and to complete the alignment films through two baking steps, i.e., pre-baking and post-baking steps. The present mode for carrying out the invention is a method in which a monomer, an oligomer, and a polymer having one or more kinds of functional groups are mixed in a liquid crystal layer and are reacted (polymerized or cross-linked) with each other using UV light (electromagnetic wave) to achieve vertical alignment instead of forming alignment films on CF and TFT substrates. It is also a technique which makes it possible to improve the reliability, manufacturing cost, and manufacturing tact time of liquid crystal panels significantly.

The present mode for carrying out the invention may be applied to transmissive, reflective or transflective LCDs. Referring to the modes of liquid crystal layers, the invention is advantageous in any of TN, OCB, VA (MVA), HAN (Hybrid Aligned Nematic) and IPS (In-Plane Switching) modes.

The use of the present mode for carrying out the invention makes it possible to provide reliable liquid crystal displays at a low cost with a high yield of manufacture.

Embodiment 5-1

A liquid crystal obtained by mixing a UV-cured acrylate monomer and a methacrylate monomer (and a polymerization initiator if the reaction rate is to be improved) in an n-type chiral nematic liquid crystal having negative dielectric constant anisotropy added with a chiral material is injected into an open cell formed by MVA type TFT and CF (color filter) substrates having no alignment film formed thereon. The cell is then irradiated with UV light from the side of the CF substrate to form polymer films that induce vertical alignment at interfaces between the substrates and the liquid crystal, thereby achieving vertical alignment.

At this time, the vertically aligning power can be further controlled by providing the substrate surfaces with surface energy by irradiating the same with UV light (preferably, UV light having a wavelength of 365 nm or less) or performing a thermal process or chemical process (a process using an organic solvent such as NMP) on the same. The chiral material mixed in the liquid crystal also results in a certain tendency, and sufficient aligning properties can be obtained under any of d/p conditions of 0.9, 0.18 and 0.35 (where p represents the chiral pitch and d represents the cell gap).

Embodiment 5-2

There is provided a reflective liquid crystal display in which reflective electrodes having unevenness are formed on a TFT substrate or a transflective liquid crystal display which has a transmissive region in part thereof. A liquid crystal obtained by mixing a UV-cured acrylate monomer and a methacrylate monomer (and a polymerization initiator if the reaction rate is to be improved) in an n-type chiral nematic liquid crystal having negative dielectric constant anisotropy added with a chiral material is injected into an open cell formed by TFT and CF substrates having no alignment film formed thereon. The cell is then irradiated with UV light from the side of the CF substrate to form polymer films that induce vertical alignment at interfaces between the substrates and the liquid crystal, thereby achieving vertical alignment. The resultant panel is then sandwiched by circular polarization plates to provide the reflective or transflective liquid crystal display.

Embodiment 5-3

A liquid crystal display employing a color display method using color filters in three primary colors R, G and B can be provided by combining Embodiment 5-1 or 5-2 with a multi-gap technique in which at least one kind of sub-pixels among sub-pixels in R, G and B are different from others in the cell thickness. In this case, retardation $\Delta$nd of the liquid crystal layer ($\Delta$n represents the birefringence of the liquid crystal layer and d represents the cell gap) is preferably in the range from 150 nm to 500 nm.

As described above, the invention makes it possible to omit the existing step of forming a vertical alignment film and to thereby allow a cost reduction.

The invention also makes it possible to form a vertical alignment film easily even if the mother glass is large.

The invention further makes it possible to reduce white lines and to thereby suppress any reduction in contrast.

What is claimed is:

1. A liquid crystal display formed by the process comprising:
dissolving a monomer material having a structure expressed by X—R (where X represents a photoreactive acrylate group or a photoreactive methacrylate group and R represents an organic group having a steroid skeleton), in a liquid crystal material, forming a liquid crystal mixture; followed by
sandwiching said liquid crystal mixture between substrates to which no alignment film was previously applied; and
irradiating, with ultraviolet rays, a surface of said substrate, thereby polymerizing said monomer material to form a polymer film at an interface of said substrate and said liquid crystal mixture.

2. A liquid crystal display formed by the process comprising:
dissolving a monomer material having a structure expressed by $X_1$—R—$X_2$ (where $X_1$ and $X_2$ represent a photoreactive acrylate group or a photoreactive methacrylate group and R represents a divalent organic group having a steroid skeleton) in a liquid crystal material, forming a liquid crystal mixture; followed by
sandwiching said liquid crystal mixture between substrates to which no alignment film has been applied; and irradiating, with ultraviolet rays, a surface of said substrate, thereby polymerizing said monomer material to form a polymer film at an interface of said substrate and said liquid crystal mixture.

3. A liquid crystal display formed by the process comprising:

dissolving a monomer material having a structure expressed by X—R (where X represents a photoreactive acrylate group or a photoreactive methacrylate group and R represents an organic group having a steroid skeleton) and a monomer material having a structure expressed by $X_1$—$R_1$—$X_2$ (where $X_1$ and $X_2$ represent an acrylate group or a methacrylate group and $R_1$ represents a divalent organic group having a steroid skeleton) in a liquid crystal material, forming a liquid crystal mixture; followed by sandwiching said liquid crystal mixture between substrates to which no alignment film has been applied; followed by irradiating, with ultraviolet rays, a surface of said substrate, thereby polymerizing said monomer material to form a polymer film at an interface of said substrate and said liquid crystal mixture.

4. A method of manufacturing a liquid crystal display comprising the steps of:

dissolving a monomer material having a structure expressed by X—R (where X represents a photoreactive acrylate group or a photoreactive methacrylate group and R represents an organic group having a steroid skeleton) in a liquid crystal material, forming a liquid crystal mixture; followed by sandwiching said liquid crystal mixture between substrates to which no alignment film has been applied; followed by irradiating, with ultraviolet rays, a surface of said substrate, thereby polymerizing said monomer material to form a polymer film on said substrate's surface at an interface of said substrate and said liquid crystal mixture.

5. A method of manufacturing a liquid crystal display comprising the steps of:

dissolving a monomer material having a structure expressed by $X_1$—R—$X_2$ (where $X_1$ and $X_2$ represent a photoreactive acrylate group or a photoreactive methacrylate group and R represents a divalent organic group having a steroid skeleton) in a liquid crystal material, forming a liquid crystal mixture; followed by sandwiching said liquid crystal mixture between substrates to which no alignment film has been applied; followed by irradiating, with ultraviolet rays, a surface of said substrate, thereby polymerizing said monomer material to form a polymer film on said substrate's surface at an interface of said substrate and said liquid crystal mixture.

6. A method of manufacturing a liquid crystal display comprising the steps of:

dissolving a monomer material having a structure expressed by X—R (where X represents a photoreactive acrylate group or a photoreactive methacrylate group and R represents an organic group having a steroid skeleton) and a monomer material having a structure expressed by $X_1$—$R_1$—$X_2$ (where $X_1$ and $X_2$ represent an acrylate group or a methacrylate group and $R_1$ represents a divalent organic group having a steroid skeleton) in a liquid crystal material, forming a liquid crystal mixture; followed by sandwiching said liquid crystal mixture between substrates to which no alignment film has been applied; followed by irradiating, with ultraviolet rays, a surface of said substrate, thereby polymerizing said monomer material to form a polymer film on said substrate's surface at an interface of said substrate and said liquid crystal mixture.

7. A method of manufacturing a liquid crystal display according to claim 4, wherein the liquid crystal material is mixed with a monomer material with two or more functions which has at least one ring structure and an acrylate group or a methacrylate group at an end thereof.

8. A liquid crystal display comprising:

a vertically aligned state of liquid crystal molecules, when no voltage is applied, that is sandwiched between a first and a second substrate;

a first polymer film alignment control layer on an interface of said first substrate, wherein said first polymer film includes a first polymer layer configured horizontally along said first substrate interface and a second polymer aligned vertically to said first polymer at said first substrate interface; and a second polymer film alignment control layer on an interface of said second substrate, wherein said second polymer film includes a first polymer layer configured horizontally along said second substrate interface and a second polymer aligned vertically to said first polymer at said second substrate interface, where said first polymer film at said first substrate interface and said second polymer film at said second substrate interface are in contact with liquid crystals between said substrates, wherein said first and second polymer film alignment layers have an ultraviolet-cured substance including a monomer material containing a photoreactive acrylate or methacrylate group and an organic group having a steroid skeleton.

\* \* \* \* \*